United States Patent
Bellini et al.

(10) Patent No.: US 9,185,879 B2
(45) Date of Patent: Nov. 17, 2015

(54) LITTER BOX ASSEMBLY

(71) Applicants: Rebecca Diane Bellini, Syracuse, NY (US); Fred Albert Marconi, Jr., Erieville, NY (US)

(72) Inventors: Rebecca Diane Bellini, Syracuse, NY (US); Fred Albert Marconi, Jr., Erieville, NY (US)

(73) Assignee: Rebecca Diane Bellini, Syracuse, NY (US)

( * ) Notice: Subject to any disclaimer, the term of this patent is extended or adjusted under 35 U.S.C. 154(b) by 58 days.

(21) Appl. No.: 13/907,176

(22) Filed: May 31, 2013

(65) Prior Publication Data

US 2013/0319340 A1    Dec. 5, 2013

Related U.S. Application Data

(60) Provisional application No. 61/794,937, filed on Mar. 15, 2013, provisional application No. 61/654,182, filed on Jun. 1, 2012.

(51) Int. Cl.
*A01K 1/01*    (2006.01)

(52) U.S. Cl.
CPC ..................... *A01K 1/0114* (2013.01)

(58) Field of Classification Search
CPC .... A01K 1/0107; A01K 1/011; A01K 1/0114
See application file for complete search history.

(56) References Cited

U.S. PATENT DOCUMENTS

| | | | |
|---|---|---|---|
| 4,886,014 A * | 12/1989 | Sheriff | 119/166 |
| 5,167,204 A | 12/1992 | Nussle | |
| 5,178,099 A | 1/1993 | Lapps et al. | |
| 5,507,252 A | 4/1996 | Ebert | |
| 6,295,949 B1 * | 10/2001 | Willis | 119/165 |
| 6,701,868 B1 | 3/2004 | Shepherd | |
| 7,198,006 B2 | 4/2007 | Fischer | |
| 7,647,889 B2 | 1/2010 | Horanoff | |
| 2002/0166510 A1 | 11/2002 | Asbury | |
| 2007/0089679 A1 | 4/2007 | Horanoff | |
| 2011/0088630 A1 | 4/2011 | Krotts et al. | |
| 2012/0318203 A1 * | 12/2012 | Andrade et al. | 119/166 |

* cited by examiner

*Primary Examiner* — Kathleen Alker
(74) *Attorney, Agent, or Firm* — Barclay Damon, LLP

(57) ABSTRACT

A litter box assembly for house pets is disclosed, which includes a container rotatably mounted to a stand, allowing the litter box to rotate from its normal position to a cleaning position and/or a resetting position. The litter box assembly includes contact portions that contact a portion of the stand or the floor in the cleaning position and the resetting position. When the contact portions contact the stand or the floor, the vibration of the litter box container caused by the contact facilitates the movement and dislodging of litter and waste. This contact can be repeated to facilitate the cleaning of the container.

18 Claims, 17 Drawing Sheets

LITTER BOX ASSEMBLY

CROSS-REFERENCE TO RELATED APPLICATIONS

This application claims the benefit of and priority to U.S. Provisional Patent Application Ser. No. 61/794,937, filed Mar. 15, 2013, and entitled "LITTER BOX ASSEMBLY," the entirety of which is incorporated herein by reference. This application also claims the benefit of and priority to U.S. Provisional Patent Application Ser. No. 61/654,182, filed Jun. 1, 2012, and entitled "LITTER BOX ASSEMBLY," the entirety of which is incorporated herein by reference.

BACKGROUND OF THE INVENTION

The subject matter disclosed herein relates to litter boxes.

Owners of household pets (e.g., cats), use litter boxes to provide the pet with a location in the household to release urine and feces. In a typical litter box, the pet climbs into the litter box and disposes of urine and feces into the litter, which must be cleaned periodically to remove the waste (e.g., clumped litter from urine and solid feces).

Manual litter boxes come in a number of different designs, including simple litter pans and sifting litter boxes. A simple litter pan, which may be opened or covered with a hood, requires that the litter be manually cleaned with a hand held scoop to dig into the litter and remove or separate the waste from the litter. Sifting litter boxes include an integrated grate lining the bottom of the litter pan. To clean the litter, the grate is lifted up through the litter or the litter is poured through the grate, enabling the grate to capture the waste without the use of a scoop.

Although inexpensive, these manual litter boxes, which are often not aesthetically pleasing, present a number of challenges to both the pet and the pet owner. Many manual litter boxes are not deep or wide enough to provide adequate space for larger pets. In addition, many pets do not like the feel of the sifting grate in sifting litter boxes when they are digging into the litter. For manual litter boxes that must be cleaned with a scoop, this must be done frequently and can be labor intensive. The scooping process can be highly unpleasant, requiring the pet owner to kneel down or bend over to access the litter, which is typically malodorous and dusty and can be quite heavy when soiled. Scooping the waste out of the manual litter box is often made more difficult when the litter sticks to the sides or the box or resides in the corners of the box, which are hard to access with the scoop, which is typically not ergonomically designed. For sifting litter boxes, pouring the filtered litter back into the box over the grate can be heavy and awkward. Open manual litter boxes also allow the pets to kick or otherwise move litter outside of the manual litter box, requiring additional cleaning by the pet owner. Closed litter boxes, using hoods, can resolve the problem of litter escaping the litter box, but do not allow for sufficient air circulation and are not preferred by many pets, which dislike the enclosed space of the litter box.

Given the disadvantages associated with manual litter boxes, automatic litter boxes, including those with combing mechanisms, rotation mechanisms, and self washing systems, are offered. While the automatic litter boxes can improve upon manual litter boxes, they are expensive and require complicated connections to electrical and/or water sources to operate, which may not be available in the desired location for the litter box. Furthermore, the automatic litter boxes employing combing mechanisms often have difficulty removing larger waste or can miss smaller waste that is not captured by the tines, which must be cleaned periodically to remove waste. In addition, these automatic litter boxes are loud in operation and frequently require replacement of disposable parts, further increasing costs.

The discussion above is merely provided for general background information and is not intended to be used as an aid in determining the scope of the claimed subject matter.

BRIEF DESCRIPTION OF THE INVENTION

A litter box assembly for house pets is disclosed, which includes a container rotatably mounted to a stand, allowing the litter box to rotate from its normal position to a cleaning position and/or a resetting position. The litter box assembly includes contact portions that contact a portion of the stand or the floor in the cleaning position and the resetting position. When the contact portions contact the stand or the floor, the vibration of the litter box container caused by the contact facilitates the movement and dislodging of litter and waste. This contact can be repeated to facilitate the cleaning of the container. Advantages that may be realized by the practice of some of the disclosed embodiments is that a litter box may be cleaned without extensive labor or time and without having to discard unsoiled litter that may be reused.

In one embodiment, a litter box assembly is disclosed. The litter box comprises a container having a length, the container comprising a longitudinal axis extending through the length of the container, a first end comprising an enclosed opening for allowing an animal to enter an interior of the container, a center section adjacent to the first end of the container, the center section comprising a first litter pan substantially parallel to the longitudinal axis for holding the litter, and a second end adjacent to the center section of the container, the second end comprising a drawer extending across the interior of the container transversely to the longitudinal axis, the drawer comprising a grate for filtering the waste from the litter from the first litter pan, and a second litter pan extending transversely to the longitudinal axis of the container proximate to the drawer for receiving the litter from the first litter pan that passes through the grate of the drawer, wherein the drawer is located between the first litter pan and the second litter pan.

In another embodiment, the litter box assembly further comprises a stand configured to rest on a supporting surface, wherein the container is mounted to the stand, and wherein the stand is configured to suspend the container above and parallel to the supporting surface in a first position, and to rotate the container in a first rotational direction to a second position and a second and opposite rotational direction to a third position.

In yet another embodiment, the litter box assembly further comprises a first contact portion on the container configured for contacting a portion of the stand or the supporting surface when the container is rotated in the first rotational direction to the second position, wherein the container is configured so that a vibration caused by the first contact portion contacting the portion of the stand or the supporting surface in the second position will facilitate litter moving from the first litter pan to the second litter pan through the drawer, and a second contact portion on the container configured for contacting a portion of the stand or the supporting surface when the container is rotated in the second rotational direction to the third position, wherein the container is configured so that a vibration caused by the second contact portion contacting the portion of the stand or the supporting surface in the third position will facilitate litter moving from the second litter pan to the first litter pan through the drawer.

In still another embodiment, the litter box assembly comprises a latch mechanism located proximate to the second end of the container for controlling rotational movement of the container with respect to the stand, the latch mechanism comprising a pin extending from the stand toward the second end of the container, a first arm having a proximal end and a distal end, the proximal end of the first arm pivotally attached to a first pivot attached to the second end of the container, wherein the first pivot biases the first arm in the first rotational direction toward the pin, and the distal end of the first arm having a hook having an first surface and a second surface, the first surface of the hook configured for contacting and engaging the pin when the container is rotated in the first rotational direction from the first position toward the second position and preventing further rotation of the container in the first rotational direction, and the second surface of the hook oriented an acute angle relative to the proximal end of the first arm and configured for contacting the pin when the container is rotated in the second rotational direction from the second position toward the third position and rotating the first arm in the second rotational direction against the bias of the first pivot past the pin to allow further rotation of the container in the second rotational direction, and a second arm having a proximal end and a distal end, the proximal end of the second arm pivotally attached to a second pivot attached proximate to the proximal end of the first arm, wherein the second pivot biases the second arm in the second rotational direction toward the hook, and the distal end of the second arm having an extension extending toward the second end of the container and configured for contacting the hook at the distal end of the first arm, wherein the second harm has a first surface and a second surface, the first surface of the second arm configured for contacting the pin when the container is rotated in the second rotational direction second rotational direction from the second position toward the third position and rotating the first arm in the first rotational direction against the bias of the first pivot past the pin to allow further rotation of the container in the second rotational direction, and the second surface of the second arm configured for contacting the pin when the container is rotated in the first rotational direction from the third position toward the second position and rotating the second arm in the second rotational direction to press against the hook and prevent the hook from contacting the pin to allow further rotation of the container in the first rotational direction.

This brief description of the invention is intended only to provide a brief overview of subject matter disclosed herein according to one or more illustrative embodiments, and does not serve as a guide to interpreting the claims or to define or limit the scope of the invention, which is defined only by the appended claims. This brief description is provided to introduce an illustrative selection of concepts in a simplified form that are further described below in the detailed description. This brief description is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of the invention. In the drawings, like numerals are used to indicate like parts throughout the various views. Thus, for further understanding of the invention, reference can be made to the following detailed description, read in connection with the drawings in which.

DETAILED DESCRIPTION OF THE INVENTION

Figure 1:
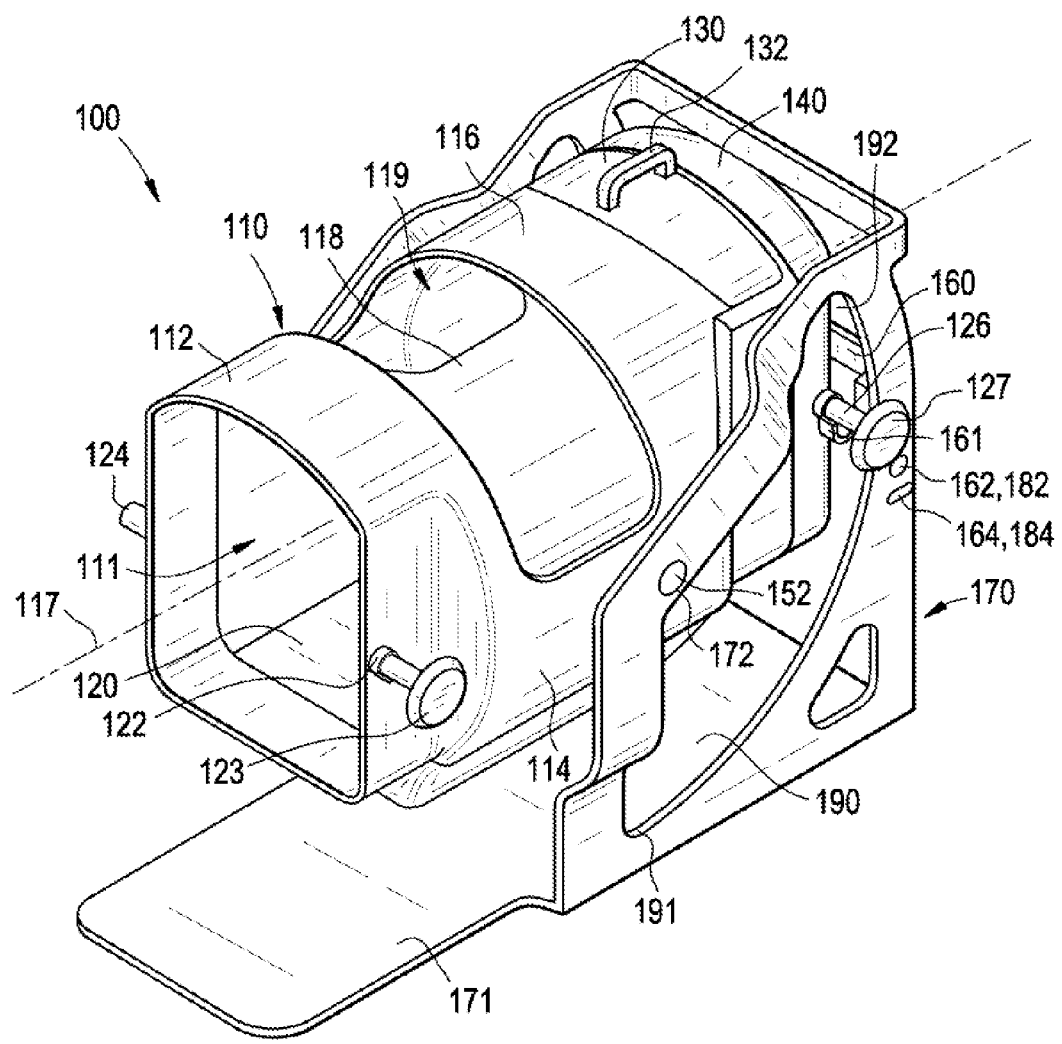
FIG. 1 is a perspective view of a first embodiment of an exemplary litter box assembly.

As shown in the figures and as described in more detail below, a first embodiment of a litter box assembly 100 for house pets is disclosed, which includes a container 110 rotatably mounted to a stand 170 configured to rest on a supporting surface (e.g., a floor), wherein the container is suspended by the stand above the supporting surface. The stand allows the container 110 to rotate from its normal position substantially parallel to the supporting surface on which the litter box assembly 100 is placed (FIGS. 1-3B) to a cleaning position substantially vertical relative to the supporting surface on which the litter box assembly 100 is placed (FIGS. 4A and 4B) and/or a resetting position substantially diagonal relative to the supporting surface on which the litter box assembly 100 is placed (FIGS. 5A and 5B). The litter box assembly 100 includes at least one handle 126, 128 that contacts a front guide stop 191, 195 of the stand 170 in the cleaning position and a rear guide stop 192, 196 of the stand 170 in the resetting position. When the handles 126, 128 contact the guide stops 191, 192, 195, 196 of the stand 170, the vibration of the container 110 caused by the contact facilitates the movement and dislodging of litter and waste. This contact between the handles 126, 128 and the guide stops 191, 192, 195, 196 of the stand 170 can be repeated to facilitate the cleaning of the container 110.

Figure 2:
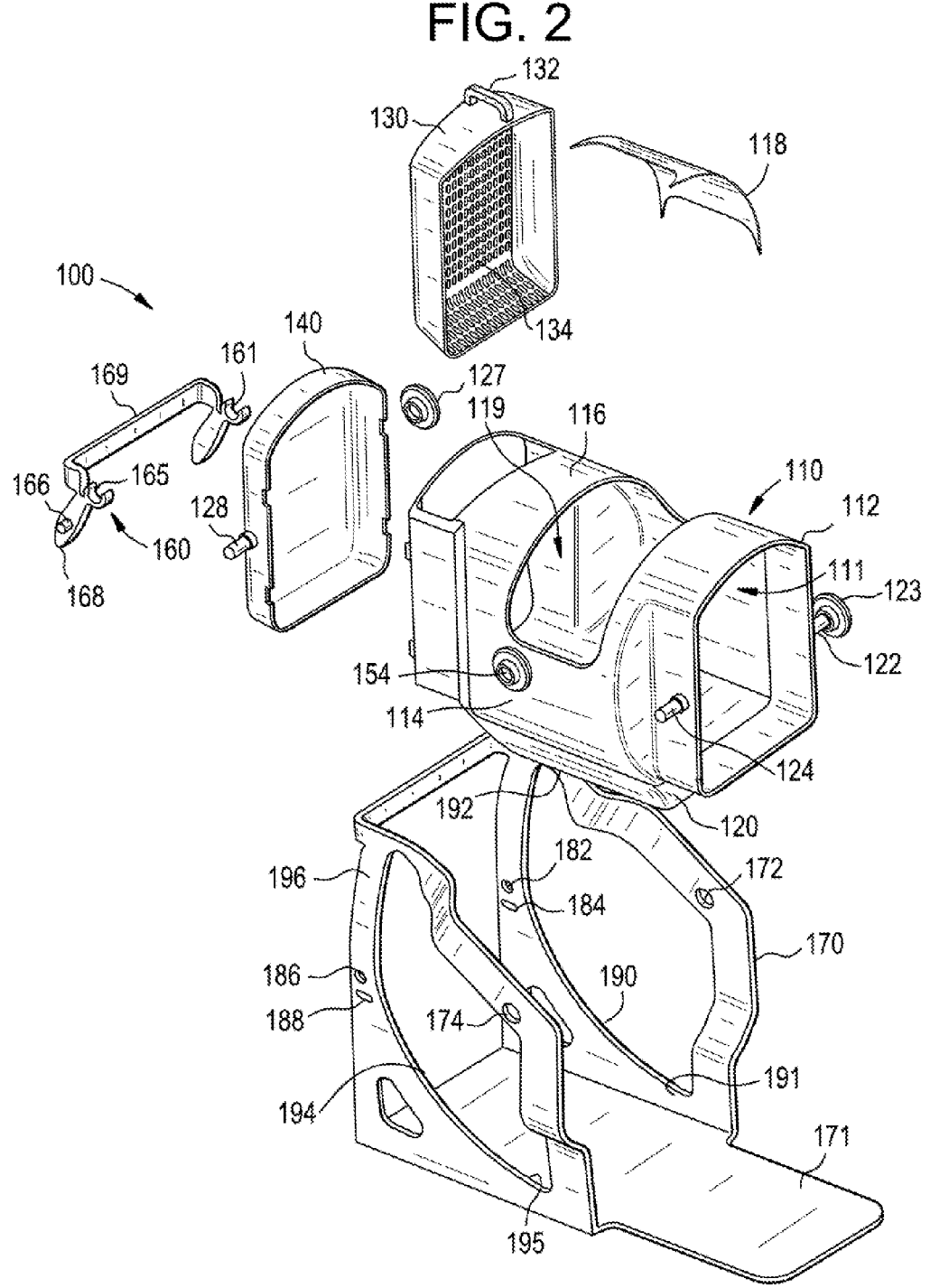
FIG. 2 is an exploded view of the exemplary litter box assembly of FIG. 1.

FIGS. 1 and 2 are perspective and exploded views of an exemplary litter box assembly 100. The exemplary litter box assembly 100 comprises a container 110 rotatably mounted to a stand 170 with a longitudinal axis 117 extending through the length of the container 110. The center section 114 of the container 110 is rotatably mounted to the stand 170 by inserting a right center rotation pin 152 of the container 110 into a right center aperture 172 of the stand 170, and inserting a left center rotation pin 154 of the container 110 into a left center aperture 174 of the stand 170. The center rotation pins 152, 154 of the container 110 can rotate within the center apertures 172, 174 of the stand 170, allowing the container 110 to change positions (as shown in FIGS. 1-5B). Although in the exemplary embodiment, the litter box assembly 100 comprises two separate parts—the container 110 and the stand 170—mounted together, in other embodiments the container 110 and the stand 170 can form a single part.

The enclosed front opening 111 (i.e., surrounded on all sides) located in the front (first) end 112 of the container 110 allows a pet to enter the interior of the container 110 and travel from the front end 112 to the center section 114 and on to the rear (second) end 116 of the container 110. In one embodiment, the front end 112 and the rear end 116 of the container 110 can have parallel sides orthogonal to a bottom surface, with a curved (or arched) top surface, while the center section 114 of the container 110 is substantially cylindrical, allowing for additional space on the interior of the container 110. In one embodiment, the center section 114 has a diameter of 12.0 in. (30.48 cm). A center (first) litter pan 120 is located at the bottom of the center section 114 of the container 110 for holding litter substantially parallel to the longitudinal axis 117. In one embodiment, the center litter pan 120 is fixedly attached to the center section 114 of the container 110. In another embodiment, the center litter pan 120 is integral with the center section 114. The center litter pan 120 can have sloped walls to promote the movement and sliding of litter into and out of the center litter pan 120. The center litter pan 120 can also include a visible line or other indicator for indicating the preferred height of the litter in the container 110, preventing over filling of the center litter pan 120.

In one embodiment, a cover 118 can be installed on the top of the center section 114 of the container 110. The cover 118 can be slid in or removed from the center section 114 of the container 110. The cover 118 can be configured to only cover a portion of the center section 114 of the container 110, leaving a window 119 to access the interior of the container 110. This window 119 (e.g., an 8.0 in. (20.32 cm) by 8.0 in (20.32 cm) opening) provides improved air circulation through the container 110 and provides access for filling the center litter pan 120 with litter. The window 119 also provides an open environment for a pet that may dislike a closed environment provided by conventional hooded litter boxes. A larger pet may be able to extend its head through the window 119. While the container 110 has a window 119 and an enclosed front opening 111, it appears to be a closed litter box from a side perspective (see FIGS. 3A-5B), enhancing the aesthetics of the litter box assembly 100. In addition, although the container 110 has a window 119 and an enclosed front opening 111, it remains substantially closed, preventing a pet from kicking or otherwise moving litter outside of the container 110.

Figure 6A:
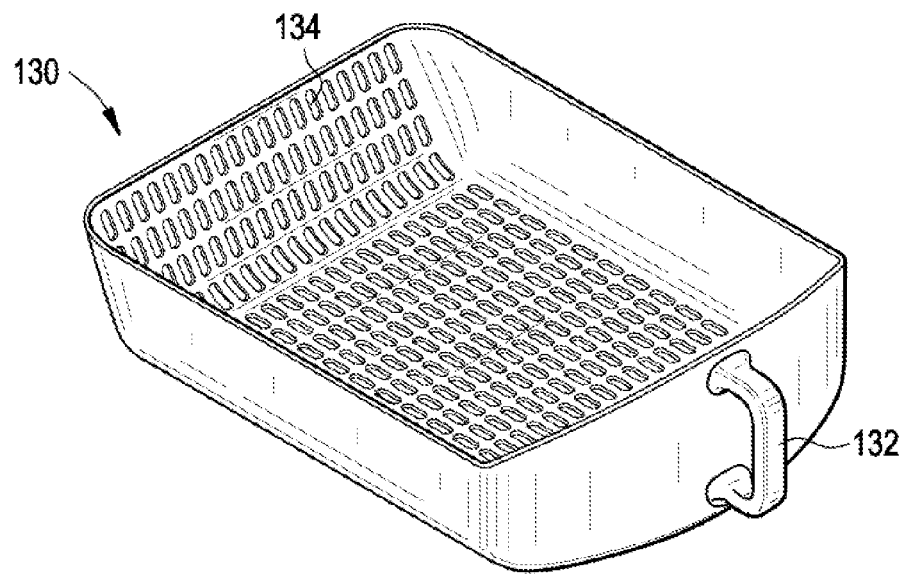
FIG. 6A is perspective view of an exemplary sifting drawer used in the exemplary litter box assembly of FIG. 1.
Figure 6B:
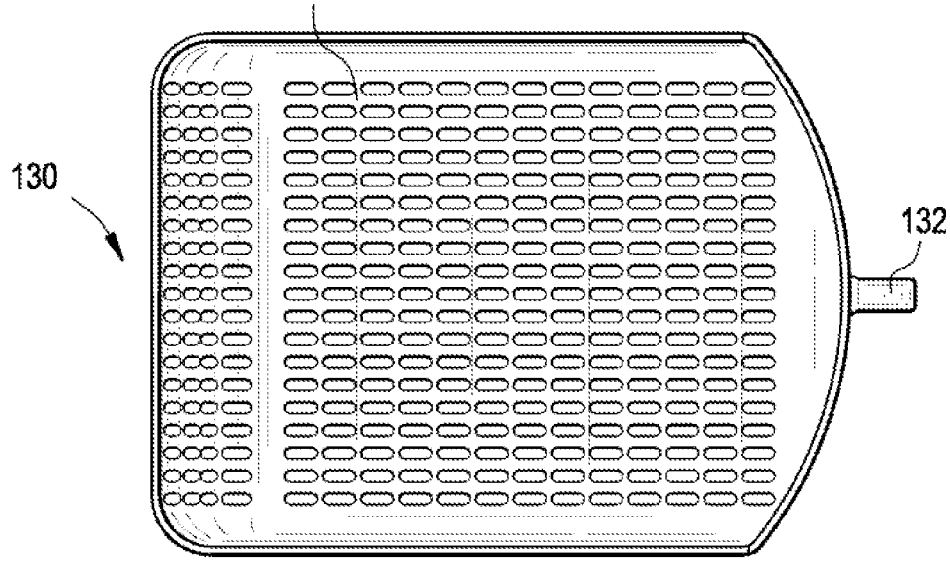
FIG. 6B is a top view of the exemplary sifting drawer used in the exemplary litter box assembly of FIG. 1.
Figure 6C:
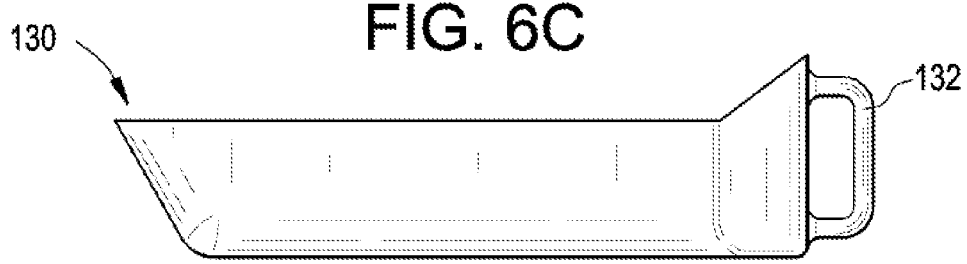
FIG. 6C is a view of the exemplary sifting drawer used in the exemplary litter box assembly of FIG. 1.

Referring again to FIGS. 1 and 2, a sifting drawer 130 is removably attached to the rear end 116 of the container 110, extending across the interior of the container 110 transversely to the longitudinal axis 117. The sifting drawer 130 can be slid into and out of the rear end 116 of the container 110 using a handle 132. A rear (second) litter pan 140 is located proximate to the sifting drawer 130 and extends transversely to the longitudinal axis 117 of the container. As will be explained, during cleaning, the sifting drawer 130 (FIGS. 6A-6C) has a grate 134 (or sieve) on its bottom surface, which allows unsoiled litter to pass directly from the center litter pan 120 through to the rear litter pan 140, while retaining waste (e.g., clumped litter from urine and solid feces) in the sifting drawer 130 on the grate 134. In one embodiment, the sifting drawer 130 and grate 134 extend transversely across the entirety of the interior of rear end 116 of the container 110 such that all of the litter and waste held in the center litter pan 120 passes into the sifting drawer 130 and onto the grate 134 during cleaning.

As shown in FIGS. 1 and 2, a right front handle 122 extends from the right side of the front end 112 of the container 110, while a left front handle 124 extends from the left side of the front end 112 of the container 110. As will be explained, the front handles 122, 124 can be used to rotate the container 110 from its normal (first) position (FIGS. 1-3C) to its cleaning (second) position (FIGS. 4A and 4B) and resetting (third) position (FIGS. 5A and 5B). Similarly, a right rear handle 126 extends from the right side of the rear end 116 of the container 110, while a left rear handle 128 extends from the left side of the rear end 116 of the container 110. In one embodiment, a front handle grip 123 is located on the distal end of the right front handle 122 to facilitate rotating of the container 110 using the right front handle 122. In addition, a rear handle grip 127 is located on the distal end of the right rear handle 126 to facilitate rotating of the container 110 using the right rear handle 126. It will be understood that a different number of handles as well as handles in other locations can be used in other embodiments.

The stand 170 has a right guide 190 for guiding the right rear handle 126 and a left guide 194 for guiding the left rear handle 128 during rotation of the container 110. The right guide 190 has a front guide stop 191 and a rear guide stop 192 for limiting the distance of rotation of the container 110 as the right rear handle 126 contacts the right guide stops 191, 192. Similarly, the left guide 194 has a front guide stop 195 and a rear guide stop 196 for limiting the distance of rotation of the container 110 as the left rear handle 128 contacts the left guide stops 195, 196.

Figure 7:
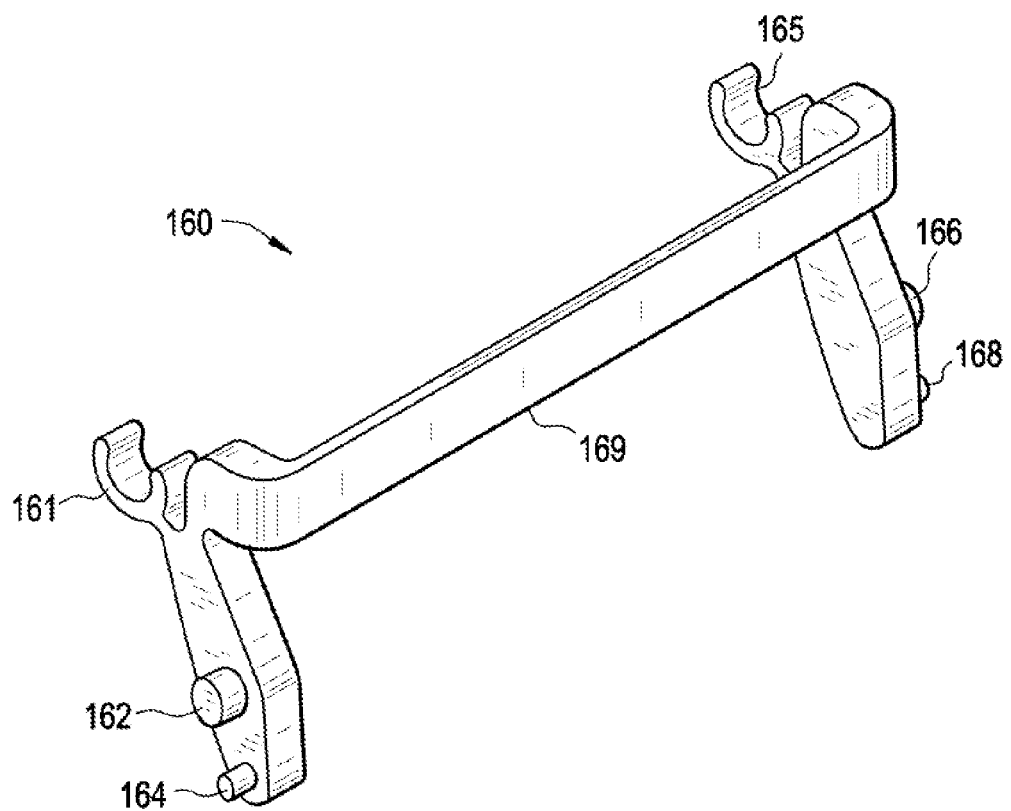
FIG. 7 is a perspective view of an exemplary latch mechanism used in the exemplary litter box assembly of FIG. 1.

As shown in FIGS. 1, 2, and 7, the litter box assembly 100 includes a latch mechanism 160 for controlling (i.e., preventing and allowing) rotational movement of the container 110 with respect to the stand. In one embodiment, the latch mechanism 160 is rotatably mounted to the stand 170 by inserting a right latch rotation pin 162 of the latch mechanism 160 into a right latch aperture 182 of the stand 170, and inserting a left latch rotation pin 166 of the latch mechanism 160 into a left latch aperture 186 of the stand 170. The latch mechanism 160 can be rotated by its latch handle 169. The distance of rotation of the latch mechanism 160 is limited by the right latch travel limit pin 164 of the latch mechanism 160, which is inserted into the right latch slot 184 of the stand 170, and by the left latch travel limit pin 168, which is inserted into the left latch slot 188 of the stand 170. The latch mechanism 160 can hold the container 110 in a normal position (FIGS. 1-3C) by placing the right rear handle 126 in the right latch clamp 161 of the latch mechanism and by placing the left rear handle 128 in the left latch clamp 165 of the latch mechanism 160. In the normal position, the latch mechanism 160 prevents the container 110 from tipping (i.e., rotating in a counterclockwise direction) when a pet enters the container 110. In one embodiment, the container 110 is rotatably mounted to the stand 170 and suspended above the base 171 of the stand 170, without the use of any additional supports under the container 110, which is held in its normal position by the latch mechanism 160. In another embodiment, a foot pedal latch release may be used in conjunction with a spring mechanism to rotate the container 110.

Figure 3A:
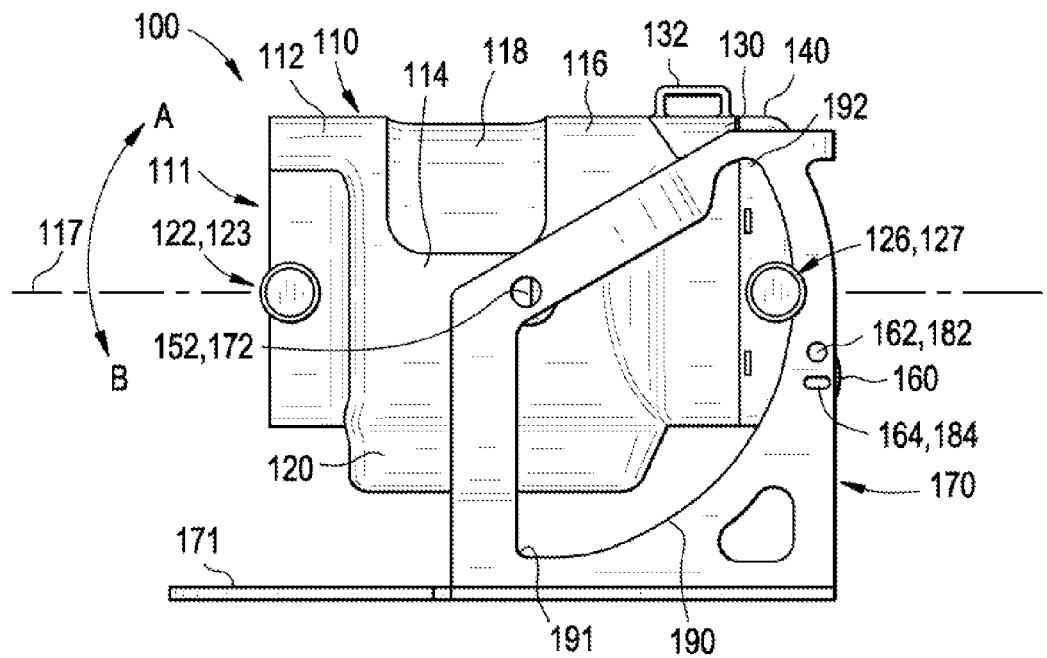
FIG. 3A is a view of the right side of the exemplary litter box assembly of FIG. 1 in a normal (first) position.
Figure 3B:
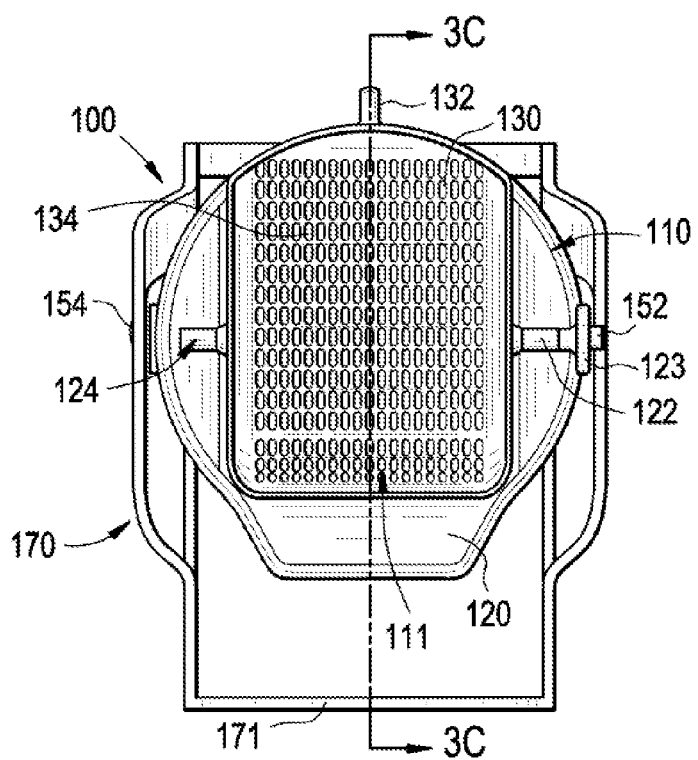
FIG. 3B is a view of the front of the exemplary litter box assembly of FIG. 1 in the normal position.
Figure 3C:
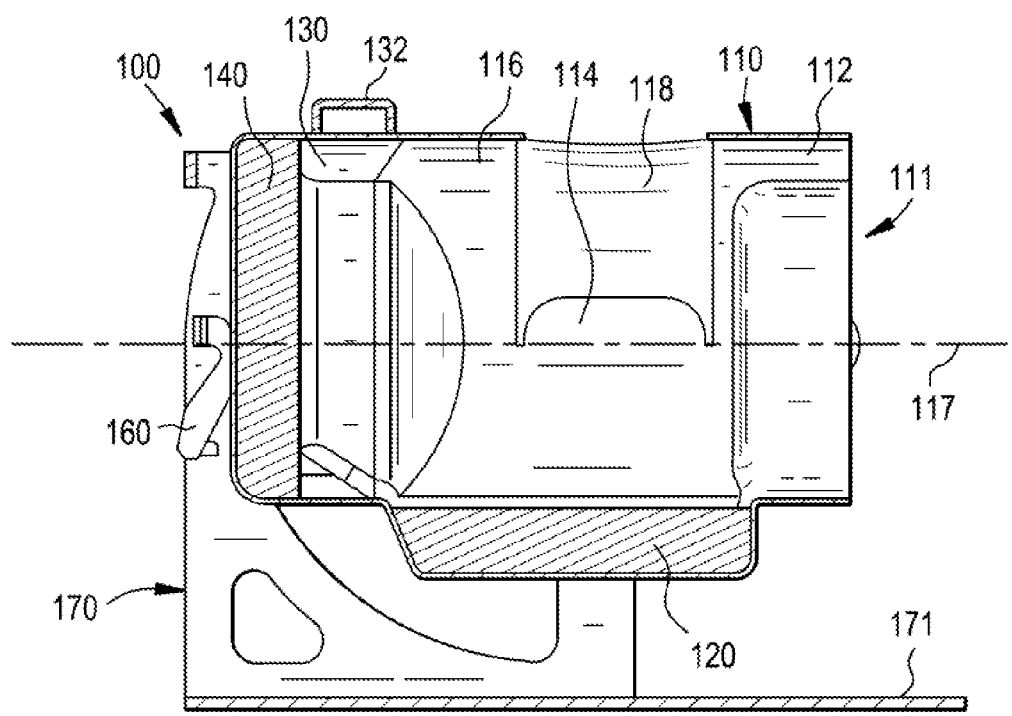
FIG. 3C is a cross-sectional view of the exemplary litter box assembly of FIG. 1 in the normal position.

FIGS. 3A and 3B are side and front views of the exemplary litter box assembly 100 of FIG. 1 in a normal position. FIG. 3C is a cross-sectional view of the exemplary litter box assembly 100 of FIG. 1 in the normal operation position. The right latch clamp 161 and the left latch clamp 165 of the latch mechanism 160 (FIG. 7) hold the container 110 in the normal position by securing the right rear handle 126 and the left rear handle 128. In this normal position, the pet can enter the enclosed front opening 111 of the container 110 and release waste in the litter located in the center litter pan 120 before exiting the through the enclosed front opening 111.

Figure 4A:
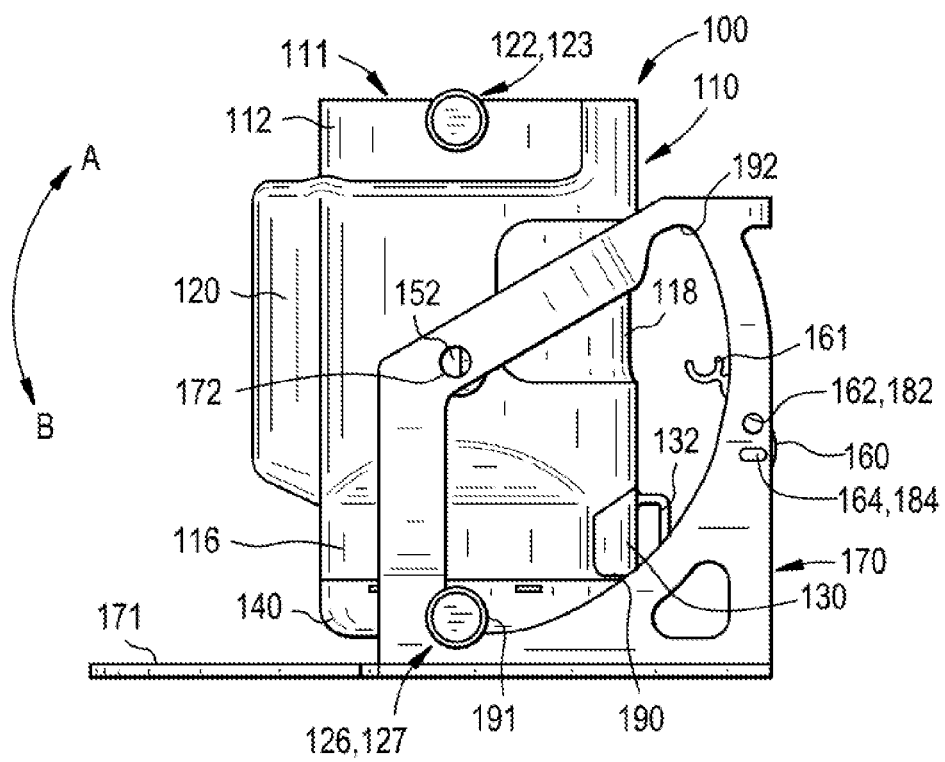
FIG. 4A is a view of the right side of the exemplary litter box assembly of FIG. 1 in a cleaning (second) position.
Figure 4B:
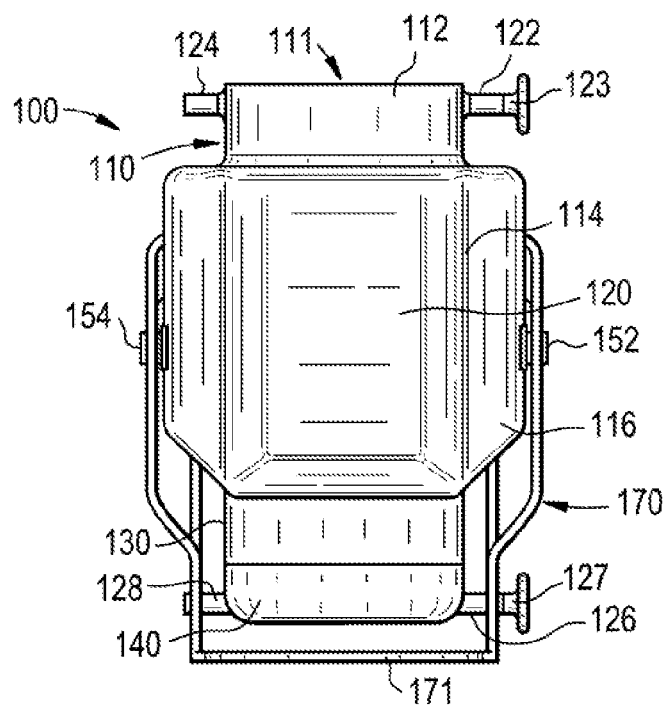
FIG. 4B is a view of the front of the exemplary litter box assembly of FIG. 1 in the cleaning position.
Figure 5A:
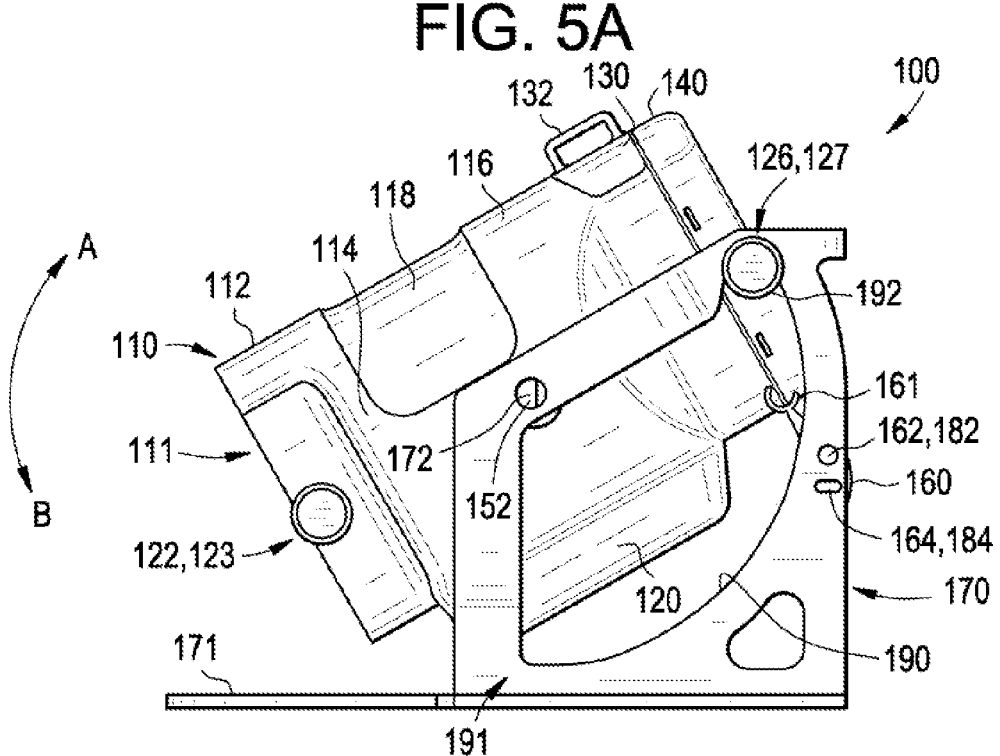
FIG. 5A is a view of the right side of the exemplary litter box assembly of FIG. 1 in a resetting (third) position.
Figure 5B:
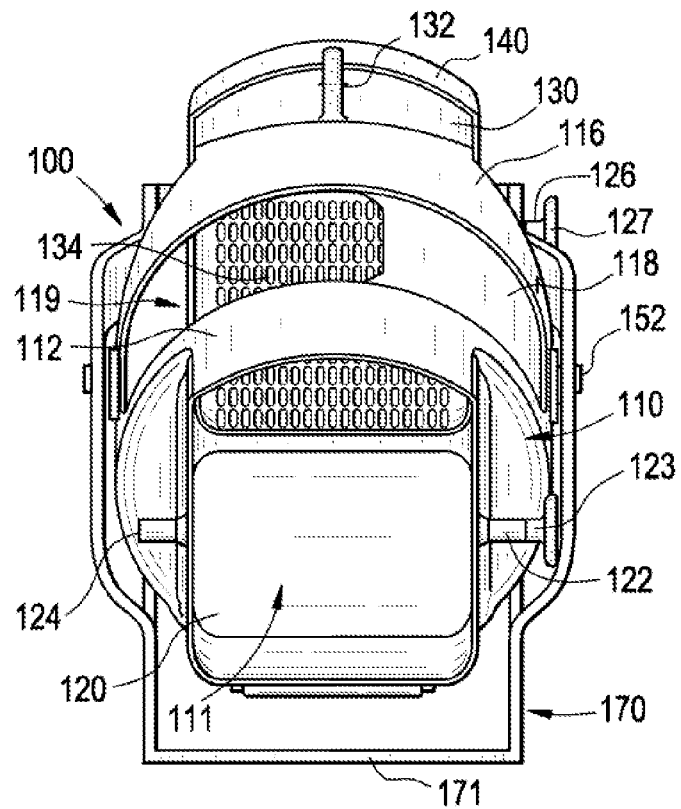
FIG. 5B is a view of the front of the exemplary litter box assembly of FIG. 1 in the resetting position.

In order to clean the container 110, the latch mechanism 160 is rotated by its latch handle 169 to release the rear handles 126, 128 from the latch clamps 161, 165 to release the container 110, which is then rotated in a clockwise direction (direction A) to a cleaning position (shown in FIGS. 4A & 4B). The container 110 can be rotated manually (e.g., using one or more of the handles 122, 124, 128, 126) or automatically using a spring mechanism. FIGS. 4A and 4B are side and front views of the exemplary litter box assembly 100 of FIG. 1 in the cleaning position. Once released from the normal position (FIGS. 1-3B), the container 110 is rotated in a clockwise direction (direction A) until the right rear handle 126 contacts the right front guide stop 191 and the left rear handle 128 contacts the left front guide stop 195. The vertical (or beyond vertical) position of the container 110 subjects the litter and waste in the center litter pan 120 to gravitational forces, causing the litter and waste to move out of the center litter pan 120 toward the rear end 116 of the container 110. When the rear handles 126, 128 contact the front guide stops 191, 195 of the stand 170, the vibration of the container 110 caused by the contact facilitates the movement and dislodging of litter and waste out of the center litter pan 120, down into the sifting drawer 130. Using the front handles 122, 124, the container 110 can be repeatedly rotated in a first rotational direction (counterclockwise direction B) and then a second rotational direction (clockwise direction A) until the rear handles 126, 128 contact the front guide stops 191, 195 of the stand 170 again to dislodge any litter or waste remaining in the center litter pan 120 until all of the litter and waste has moved to the sifting drawer 130.

The grate 134 on the bottom surface of the sifting drawer 130 (FIGS. 6A-6C) allows unsoiled litter to pass directly from the center litter pan 120 through to the rear litter pan 140, while retaining waste in the sifting drawer 130 on the grate 134. The repeated tapping of the rear handles 126, 128 against front guide stops 191, 195 of the stand 170 can facilitate the movement of the unsoiled litter through the grate 134 of the sifting drawer 130. The sifting drawer 130 can then be removed by using the sifting drawer handle 132 to slide the sifting drawer 130 out of the rear end 116 of the container 110. After the waste is discarded, the sifting drawer 130 can then be inserted back into the rear end 116 of the container 110. The sifting drawer 130 can be sized to fit in a standard trash receptacle when removed during cleaning. In one embodiment, the rear litter pan 140 is detachably attached to the container 110, allowing the rear litter pan 140 to be removed and cleaned. In another embodiment, the rear litter pan 140 is integral with the rear end 116. The removal of the rear litter pan 140 allows the container 110, including the interior, to be cleaned more easily while the filtered litter is temporarily stored in the rear litter pan 140. Once removed, the rear litter pan 140 can also be used as a conventional manual litter pan for, e.g., training pets.

Once the sifting drawer 130 and rear litter pan 140 have been inserted or attached to the container 110 in the cleaning position of FIGS. 4A and 4B, the container 110 is rotated in a counterclockwise direction (direction B) to a resetting position (shown in FIGS. 5A & 5B). The container 110 can be rotated manually (e.g., using one or more of the handles 122, 124, 128, 126) or automatically using a spring mechanism. FIGS. 5A and 5B are a side view and front view of the exemplary litter box assembly 100 of FIG. 1 in the resetting position. Once moved from the cleaning position (FIGS. 4A and 4B), the container 110 is rotated in a counterclockwise direction (direction B) until the right rear handle 126 contacts the right rear guide stop 192 and the left rear handle 128 contacts the left rear guide stop 196. The tipped position of the container 110 subjects the filtered litter in the rear litter pan 140 to gravitational forces, causing the filtered litter to move out of the rear litter pan 140 toward the center section 114 of the container 110. When the rear handles 126, 128 contact the rear guide stops 192, 196 of the stand 170, the vibration of the container 110 caused by the contact facilitates the movement and dislodging of filtered litter out of the rear litter pan 140, through the sifting drawer 130, and into the center litter pan 120. Using the front handles 122, 124, the container 110 can be repeatedly rotated in a counterclockwise (first rotational) direction (direction B) and then a clockwise (second rotational) direction (direction A) until the rear handles 126, 128 contact the rear guide stops 192, 196 of the stand 170 again to dislodge any filtered litter remaining in the rear litter pan 140 until all of the filtered litter has moved to, and is level in, the center litter pan 120. Once all of the filtered litter has moved to the center litter pan 120, the container 110 is rotated in a clockwise direction (direction A) until the container 110 returns to the normal position (FIGS. 1-3C), where the container 110 can be locked in place using the latch mechanism 160.

Figure 15:
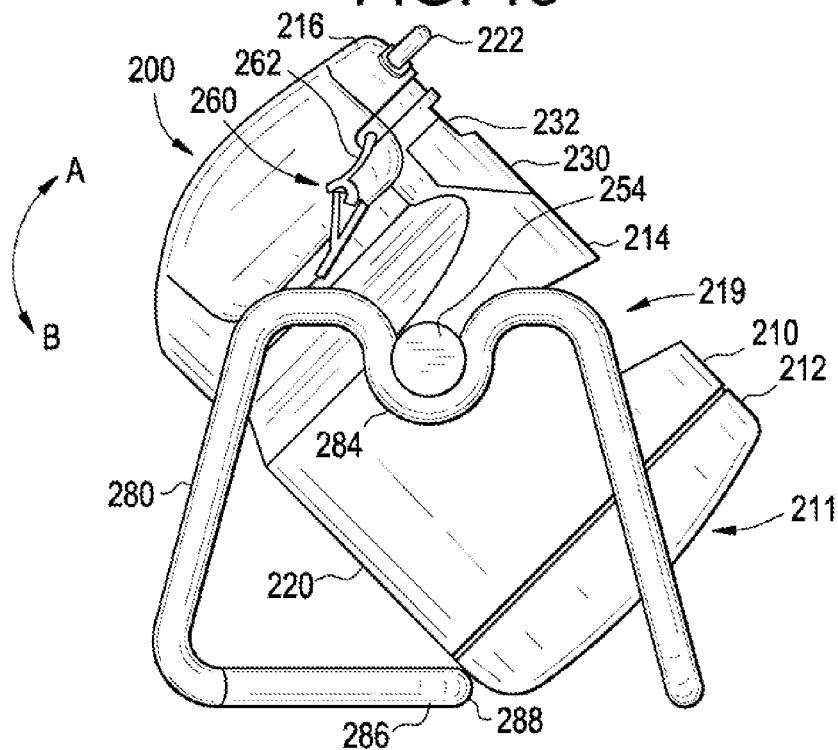
FIG. 15 is a view of the left side of the exemplary litter box assembly of FIG. 8 in a resetting (third) position.

As shown in the figures and as described in more detail below, a second embodiment of a litter box assembly 200 for house pets is disclosed, which includes a container 210 rotatably mounted to a stand 280 configured to rest on a supporting surface, wherein the container is suspended by the stand above the supporting surface. The stand allows the container 210 to rotate from its normal position substantially parallel to the supporting surface on which the litter box assembly 200 is placed (FIGS. 8-14) to a cleaning position substantially vertical relative to the supporting surface on which the litter box assembly 200 is placed (FIG. 16) and/or a resetting position substantially diagonal relative to the supporting surface on which the litter box assembly 200 is placed (FIG. 15). The container 210 includes a rear end 216 whose bottom outer surface contacts a rear stand stop 289 in the cleaning position and a front end 212 whose bottom outer surface contacts a front stand stop 288 in the resetting position. When the container 210 contacts the stops 288, 289 of the stand 280, the vibration of the container 210 caused by the contact facilitates the movement and dislodging of litter and waste. This contact between the container 210 and the stops 288, 289 of the stand 280 can be repeated to facilitate the cleaning of the container 210.

Figure 9:
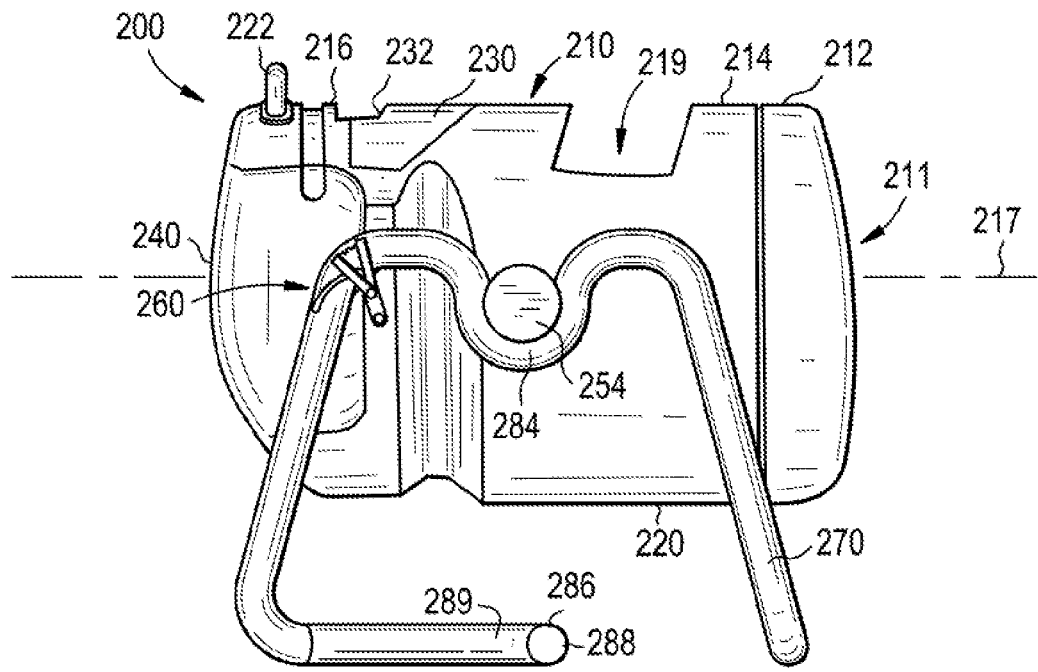
FIG. 9 is a view of the left side of the exemplary litter box assembly of FIG. 8 in a normal (first) position.
Figure 10:
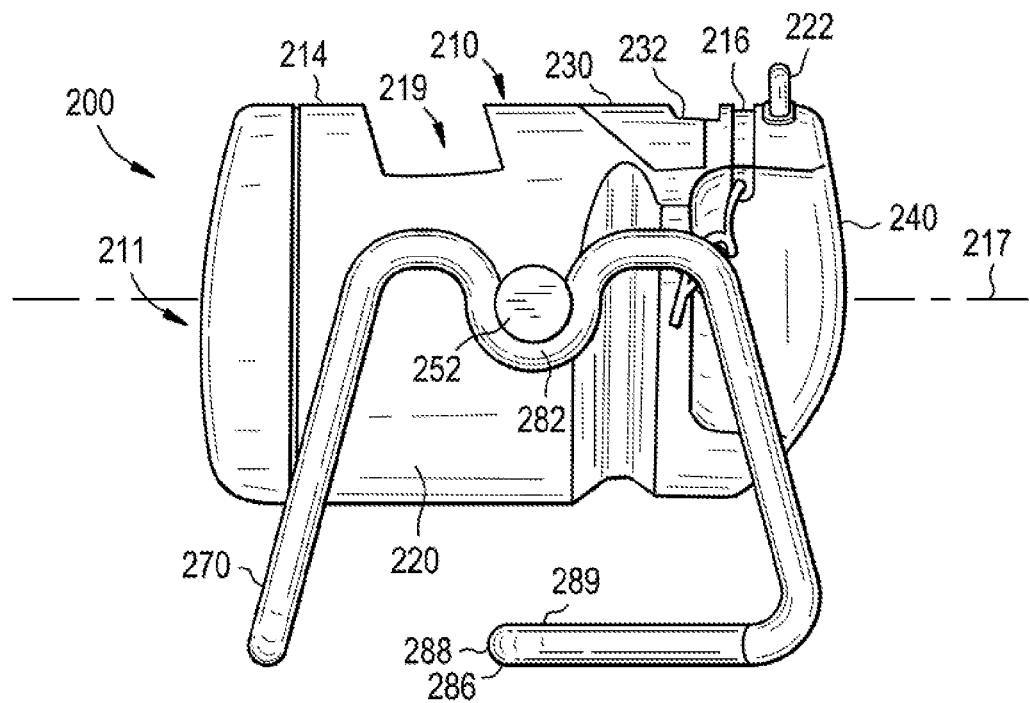
FIG. 10 is a view of the right side of the exemplary litter box assembly of FIG. 8 in the normal position.
Figure 11:
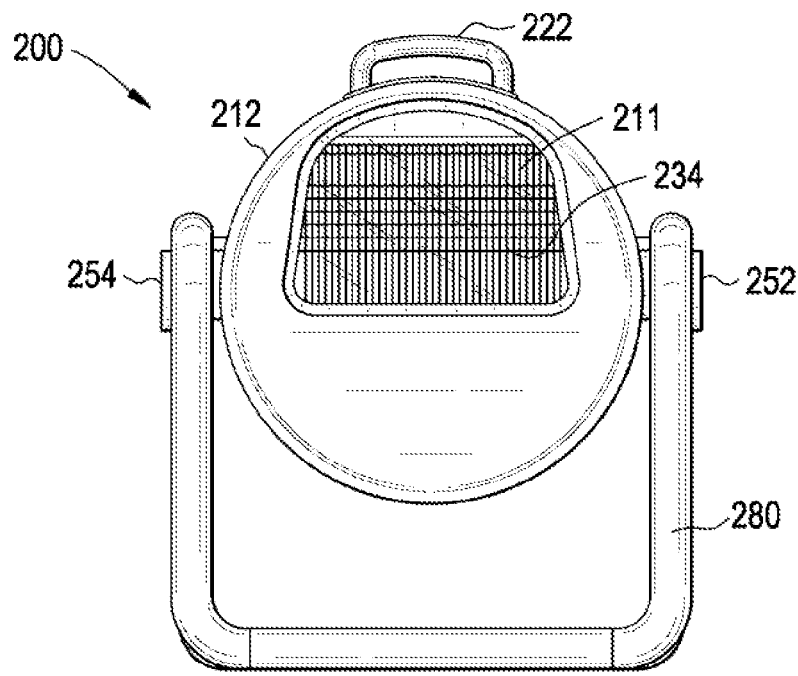
FIG. 11 is a view of the front of the exemplary litter box assembly of FIG. 8 in the normal position.
Figure 12:
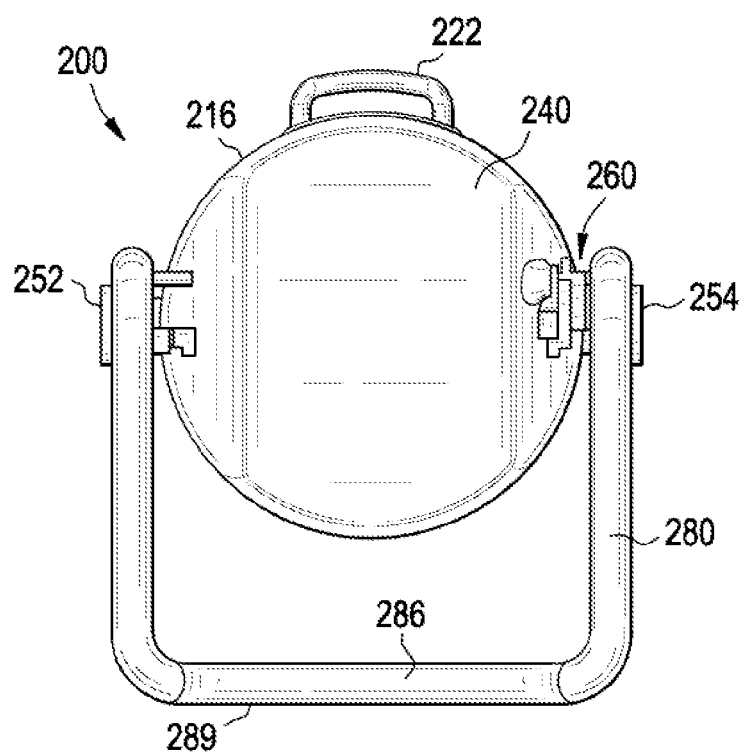
FIG. 12 is a view of the back of the exemplary litter box assembly of FIG. 8 in the normal position.
Figure 13:
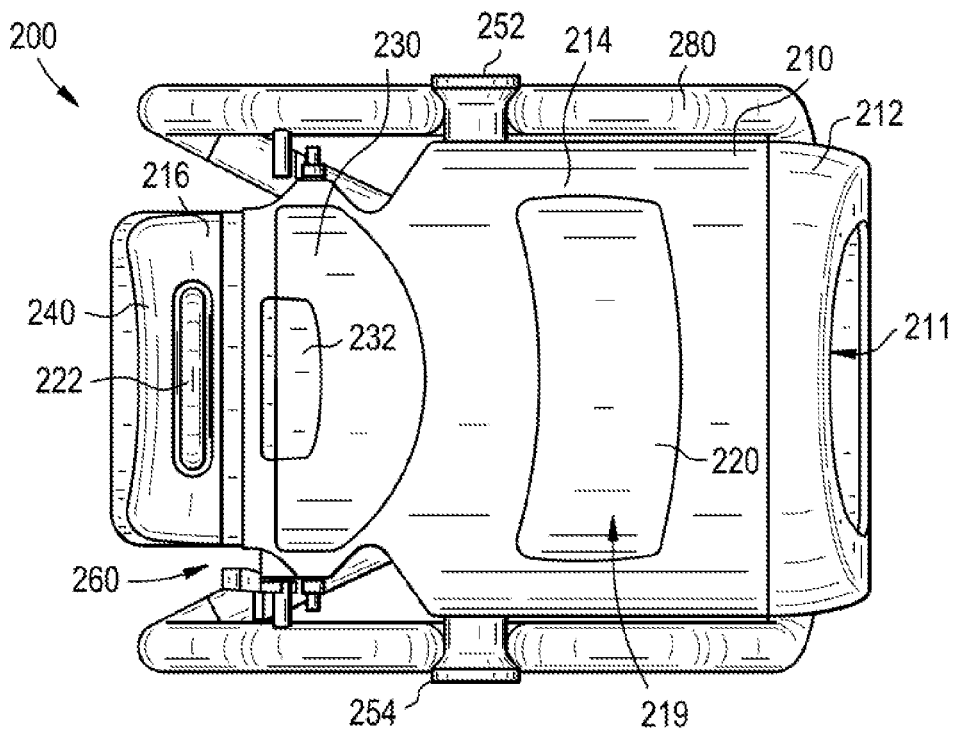
FIG. 13 is a top view of the top of the exemplary litter box assembly of FIG. 8 in the normal position.
Figure 14:
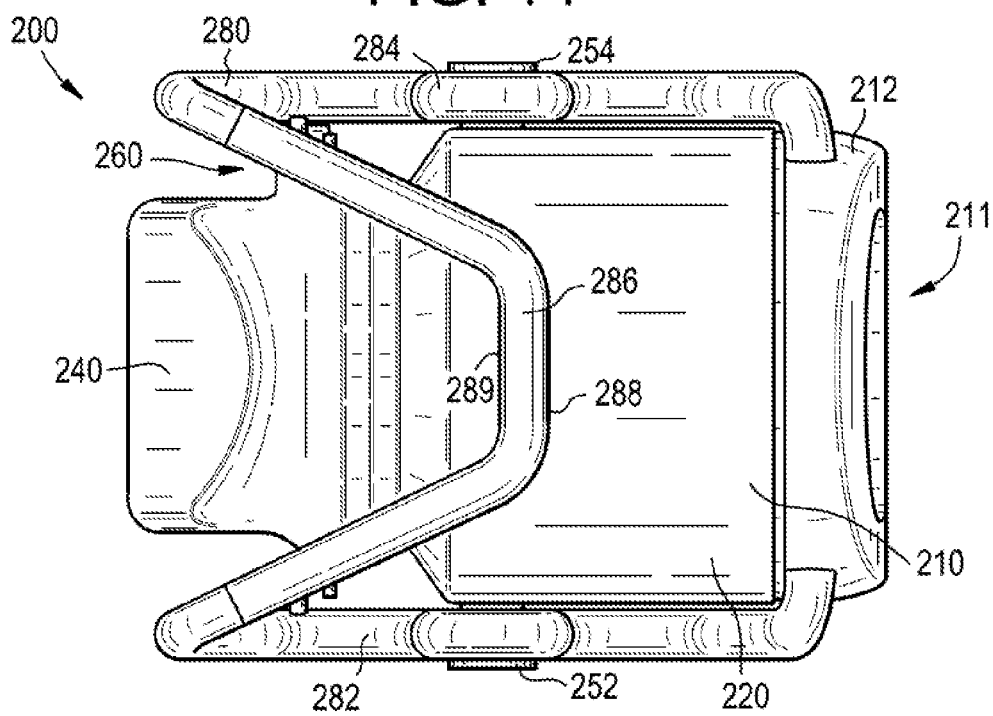
FIG. 14 is a bottom view of the top of the exemplary litter box assembly of FIG. 8 in the normal position.
Figure 16:
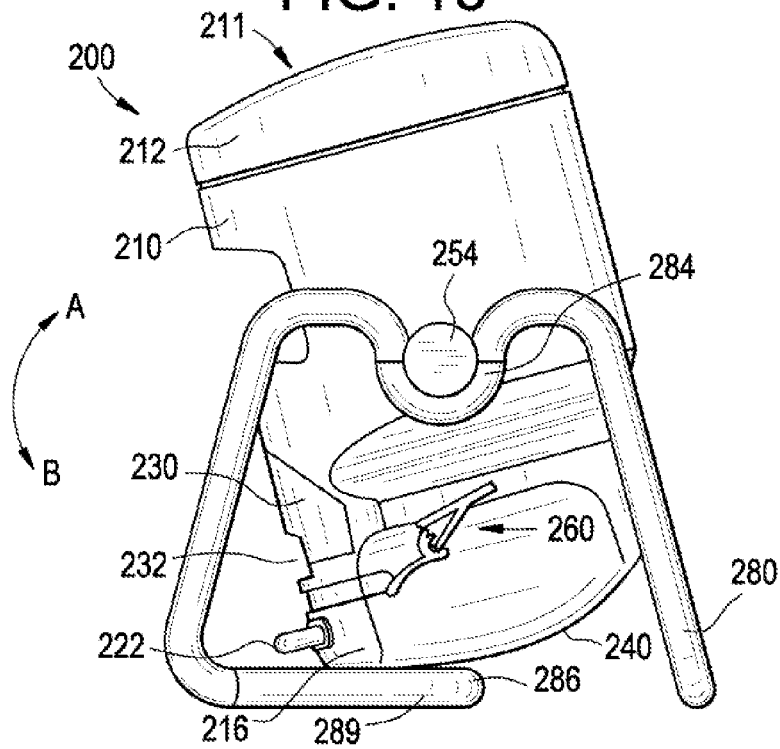
FIG. 16 is a view of the left side of the exemplary litter box assembly of FIG. 8 in a cleaning (second) position.

The exemplary litter box assembly 200 comprises a container 210 rotatably mounted to a stand 280 with a longitudinal axis 217 extending through the length of the container 210. The center section 214 of the container 210 is rotatably mounted to the stand 280 by inserting or resting a right center rotation handle 252 of the container 210 in a right stand center rotation handle support 282 of the stand 280, and inserting or resting a left center rotation handle 254 of the container 210 in a left stand center rotation handle support 284 of the stand 280. The center rotation handles 252, 254 of the container 210 can rotate within the stand center rotation handle supports 282, 284, allowing the container 210 to change positions (as shown in FIGS. 9, 15, and 16). Although in the exemplary embodiment, the litter box assembly 200 comprises two separate parts—the container 210 and the stand 280—mounted together, in other embodiments the container 210 and the stand 280 can form a single part.

The enclosed front opening 211 located in the front (first) end 212 of the container 210 allows a pet to enter the interior of the container 210 and travel from the front end 212 to the center section 214 of the container 210. In one embodiment, the rear (second) end 216 of the container 210 can have parallel sides orthogonal to a bottom surface, with a curved (or arched) top surface, while the front section 212 and the center section 214 of the container 210 are substantially cylindrical, allowing for additional space on the interior of the container 210. A center (first) litter pan 220 is located at the bottom of the center section 214 of the container 210 for holding litter substantially parallel to the longitudinal axis 217. In one embodiment, the center litter pan 220 is fixedly attached to the center section 214 of the container 210. In another embodiment, the center litter pan 220 is integral with the center section 214. The center litter pan 220 can have sloped walls to promote the movement and sliding of litter into and out of the center litter pan 220. The center litter pan 220 can also include a visible line or other indicator for indicating the preferred height of the litter in the container 210, preventing over filling of the center litter pan 220.

In one embodiment, a cover (not shown) can be installed on the top of the center section 214 of the container 210. The cover can be slid in or removed from the center section 214 of the container 210. The cover can be configured to only cover a portion of the center section 214 of the container 210. A window 219 can be provided to access the interior of the container 210. This window 219 provides improved air circulation through the container 210 and provides access for filling the center litter pan 220 with litter. The window 219 also provides an open environment for a pet that may dislike a closed environment provided by conventional hooded litter boxes. A larger pet may be able to extend its head through the window 219. While the container 210 has a window 219 and an enclosed front opening 211, it appears to be a closed litter box from a side perspective (see FIGS. 9 and 10), enhancing the aesthetics of the litter box assembly 200. In addition, although the container 210 has a window 219 and an enclosed front opening 211, it remains substantially closed, preventing a pet from kicking or otherwise moving litter outside of the container 210.

A sifting drawer 230 is removably attached to the rear end 216 of the container 210, extending across the interior of the container 210 transversely to the longitudinal axis 217. The sifting drawer 230 can be slid into and out of the rear end 216 of the container 210 using a handle 232. A rear (second) litter pan 240 is located proximate to the sifting drawer 230 and extends transversely to the longitudinal axis 217 of the container. As will be explained, during cleaning, the sifting drawer 230 has a grate 234 (or sieve) on its bottom surface, which allows unsoiled litter to pass directly from the center litter pan 220 through to the rear litter pan 240, while retaining waste in the sifting drawer 230 on the grate 234. In one embodiment, the sifting drawer 230 and grate 234 extend across the entire width of the rear end 216 of the container 210 such that all of the litter and waste held in the center litter pan 220 passes into the sifting drawer 230 and onto the grate 234 during cleaning.

A handle 222 extends from the rear end 216 of the container 210. As will be explained, the handle 222 can be used to rotate the container 210 from its normal (first) position (FIGS. 8-14) to its cleaning (second) position (FIG. 16) and resetting (third) position (FIG. 15). It will be understood that a different number of handles as well as handles in other locations can be used in other embodiments.

As will be discussed in more detail, the litter box assembly 200 includes a latch mechanism 260 for controlling (i.e., preventing and allowing) rotational movement of the container 210 with respect to the stand 280. The latch mechanism 260 can hold the container 210 in a normal position (FIGS. 8-14) preventing the container 210 from tipping (i.e., rotating in a clockwise direction (direction A)) when a pet enters the container 210 or if someone were to push down on the front end 212 of the container 210. The latch mechanism can also prevent the container 210 from tipping (i.e., rotating in a counterclockwise direction (direction B)) if a pet were to move to the rear end 216 of the container 210 or if someone were to push down on the rear end 216 of the container 210.

In order to clean the container 210, the container 210 is released from the latch mechanism 260 and then eventually rotated in a counterclockwise direction (direction B) to a cleaning position (shown in FIG. 16). The container 210 can be rotated manually (e.g., using one or more of the handles 222) or automatically using a spring mechanism. The container 210 is rotated in a counterclockwise direction (direction B) until a portion of the rear end 216 (e.g., the bottom outer surface) of the container 210 contacts the stand stop 286 on the rear stand stop 289. In an alternative embodiment, the rear end 216 of the container 210 contacts the supporting surface on which the stand 280 is placed or another object. The substantially vertical (e.g., vertical (90 degrees) or beyond vertical position (e.g., 105 degrees)) of the container 210 subjects the litter and waste in the center litter pan 220 to gravitational forces, causing the litter and waste to move out of the center litter pan 220 toward the rear end 216 of the container 210. When the rear end 216 of the container 210 contacts the stand stop 286 or the supporting surface, the vibration of the container 210 caused by the contact facilitates the movement and dislodging of litter and waste out of the center litter pan 220, down into the sifting drawer 230. The container 210 can be repeatedly rotated in a clockwise direction (direction A) and then a counterclockwise direction (direction B) until the rear end 216 of the container 210 contacts the stand stop 286 or the supporting surface again to dislodge any litter or waste remaining in the center litter pan 220 until all of the litter and waste has moved to the sifting drawer 230.

The grate 234 on the bottom surface of the sifting drawer 230 allows unsoiled litter to pass directly from the center litter pan 220 through to the rear litter pan 240, while retaining waste in the sifting drawer 230 on the grate 234. The repeated tapping of the rear end 216 of the litter box container 210 against the stand stop 286 on the front stand stop 288 or the supporting surface can facilitate the movement of the unsoiled litter through the grate 234 of the sifting drawer 230. The sifting drawer 230 can then be removed by using the sifting drawer handle 232 to slide the sifting drawer 230 out of the rear end 216 of the container 210. After the waste is discarded, the sifting drawer 230 can then be inserted back into the rear end 216 of the container 210. The sifting drawer 230 can be sized to fit in a standard trash receptacle when removed during cleaning.

Once the sifting drawer 230 has been inserted or attached to the container 210 in the cleaning position of FIG. 16, the container 210 is rotated in a clockwise direction (direction A) to a resetting position (shown in FIG. 15). The container 210 can be rotated manually (e.g., using one or more of the handles 222) or automatically using a spring mechanism. The container 210 is rotated in a clockwise direction (direction A) until a portion of the front end 212 (e.g., the bottom outer surface) of the container 210 contacts the stand stop 286 on the front stand stop 288. In an alternative embodiment, the front end 212 of the container 210 contacts the floor or another object contacts the supporting surface on which the stand 280 is placed or another object. The beyond horizontal (e.g., 45 degrees) tipped position of the container 210 subjects the filtered litter in the rear litter pan 240 to gravitational forces, causing the filtered litter to move out of the rear litter pan 240 toward the center section 214 of the container 210. When the front end 212 of the container 210 contacts the stand stop 286 or the supporting surface, the vibration of the container 210 caused by the contact facilitates the movement and dislodging of filtered litter out of the rear litter pan 240, through the sifting drawer 230, and into the center litter pan 220. The container 210 can be repeatedly rotated in a counterclockwise direction (direction B) and then a clockwise direction (direction A) until the front end 212 of the container 210 contacts the stand stop 286 or the supporting surface again to dislodge any filtered litter remaining in the rear litter pan 240 until all of the filtered litter has moved to, and is level in, the center litter pan 220. Once all of the filtered litter has moved to the center litter pan 220, the container 210 is rotated in a counterclockwise direction (direction B) until the container 210 returns to the normal position (FIGS. 8-14), where the container 210 can be locked in place using the latch mechanism 260.

Figure 8:
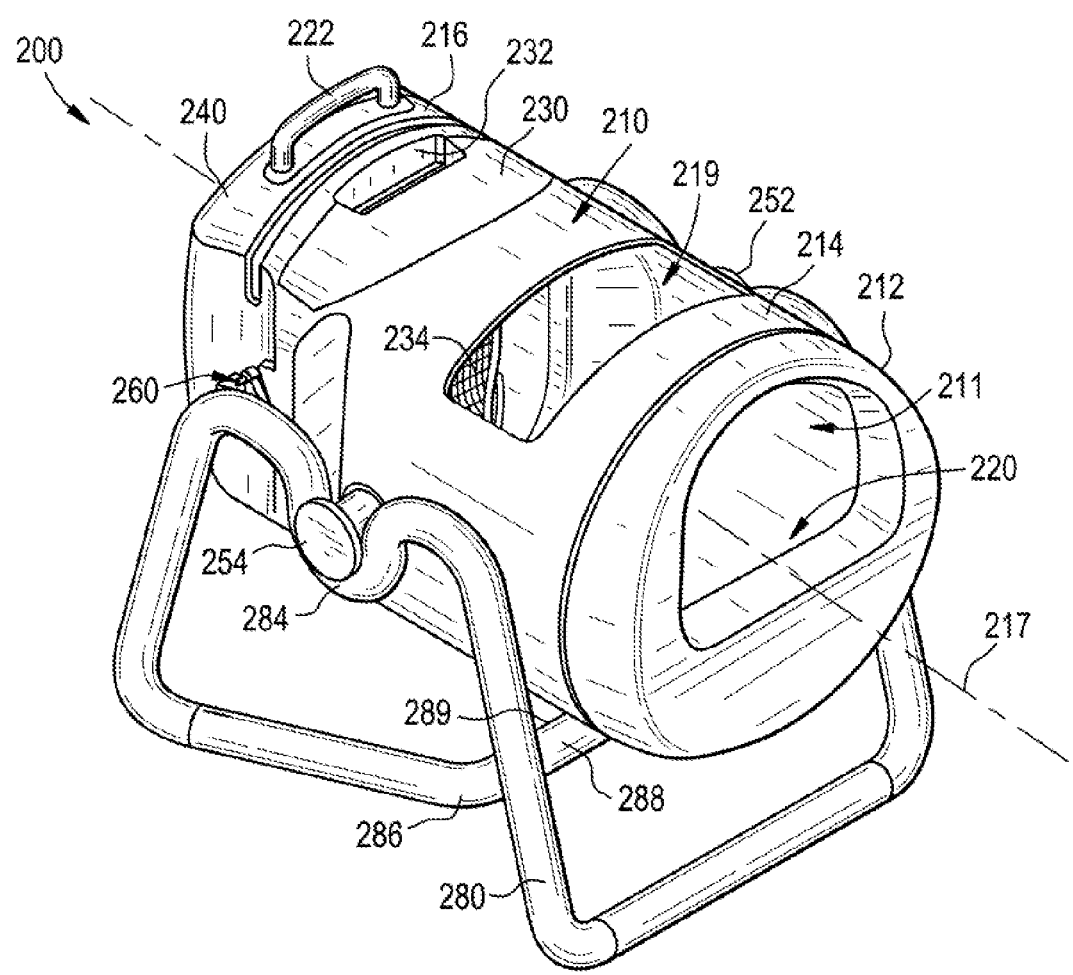
FIG. 8 is a perspective view of a second embodiment of an exemplary litter box assembly.
Figure 17:
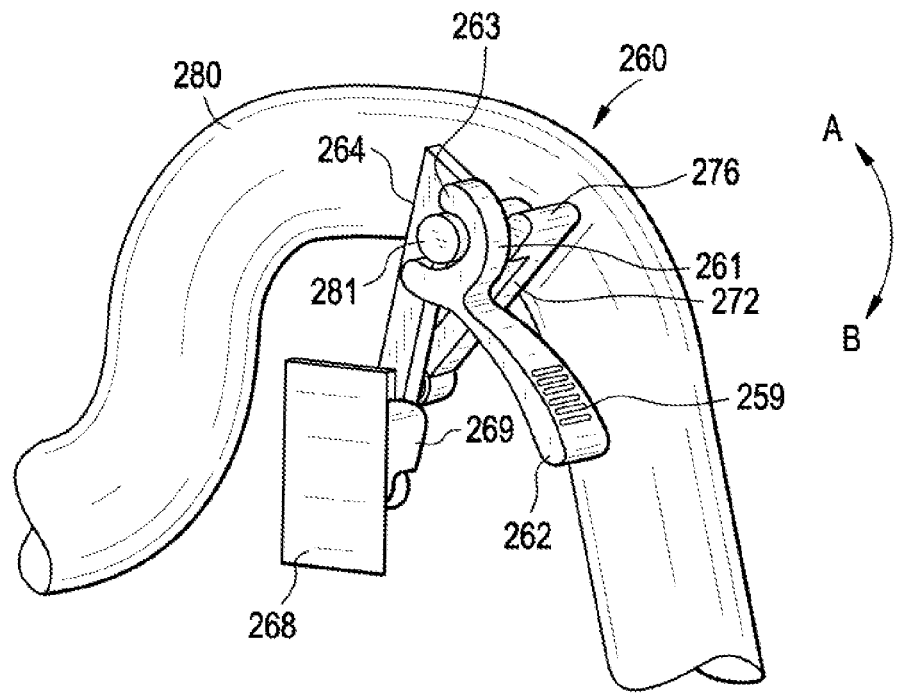
FIG. 17 is an enlarged view of the exemplary latching mechanism of the exemplary litter box assembly of FIG. 8 in the normal position.
Figure 18:
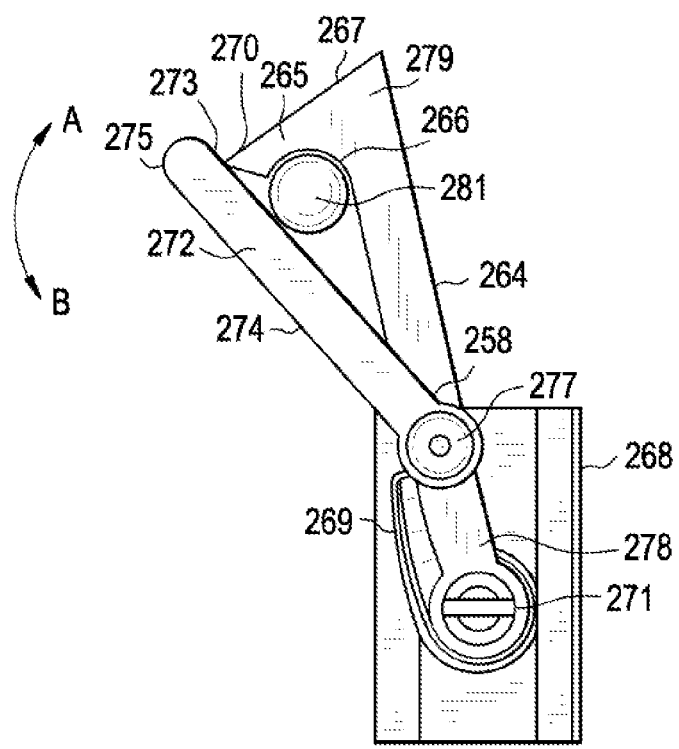
FIG. 18 is a schematic diagram of the exemplary latching mechanism of the exemplary litter box assembly of FIG. 8 in the normal position.

FIG. 17 is an enlarged view of the exemplary latching mechanism 260 of the exemplary litter box assembly 200 of FIG. 8 locked in the normal position (FIGS. 8-14). Note that FIG. 17 is shown from the interior of the stand such that the rotational directions (clockwise (direction A) and counterclockwise (direction B)) for this Figure are shown inverted for this view as compared to the other Figures. FIG. 18 is a schematic diagram of the exemplary latching mechanism 260 of the exemplary litter box assembly 200 of FIG. 8 locked in the normal position (FIGS. 8-14). The latch mechanism 260 includes three primary components: a latch lever cam lock 262, a latching (first) arm 264, and a blocking (second) arm 272. These components interact with a stand latch pin 281 extending from the interior of the stand 280 toward the rear end 216 of the container 210 to control the movement of the container 210 (not shown in FIGS. 17-24). It will be understood that although the stand latch pin 281 is shown as a circular protrusion, other shapes can be used.

The proximal end 261 of latch lever cam lock 262 (shown transparent in FIG. 17 and not shown in FIGS. 18-24 for clarity) includes a latch lever cam pivot 263 that receives a latch lever cam pin (not shown) extending from the rear portion 216 of the container 210 (not shown). As shown in the normal position, a portion of the proximal end 261 of latch lever cam lock 262 engages with the underside of the stand latch pin 281 to prevent the container 210 from rotating clockwise (direction A) from the normal position (FIGS. 8-14). When the distal end 259 of the latch lever cam lock 262 is moved clockwise (direction A) and the latch lever cam lock 262 pivots clockwise (direction A) around the latch lever cam pivot 263, the engagement of the proximal end 261 of latch lever cam lock 262 to the stand latch pin 281 is released, allowing clockwise (direction A) movement of the container 210 by, e.g., lifting handle 222 as shown in FIG. 15. The latch lever cam lock 262 then remains in this open position to avoid engagement with the stand latch pin 281 until the container 210 is returned to the normal position at which time the user can rotate the distal end 259 of the latch lever cam lock 262 counterclockwise (direction B) so that the latch lever cam lock 262 pivots counterclockwise (direction B) around the latch lever cam pivot 263 to engage the proximal end 261 of latch lever cam lock 262 to the stand latch pin 281. In one embodiment, the latch lever cam lock 262 can be held open and/or in its normal position using a spring or other retention mechanism.

While the latch lever cam lock 262 prevents rotation of the container 210 in the clockwise direction (direction A), the latching arm 264 prevents rotation of the container 210 in the counterclockwise direction (direction B) when engaged with the topside of the stand latch pin 281 as shown in FIGS. 17 and 18. The proximal end 278 of the latching arm 264 is pivotally attached to a latching arm (first) pivot 271, which is attached to a latching arm attachment block 268, which is attached to the container 210. A first torsion spring or other retention mechanism is located in the latching arm pivot 271 to bias or force the latching arm 264 in the counterclockwise direction (direction B) to engage the stand latch pin 281 and rest against a latching arm stop 269 that restricts the counterclockwise (direction B) movement of the latching arm 264. A latching arm hook 265 extends from the distal end 279 of the latching arm 264 and has an inner (first) surface 266 that contacts and engages the topside of the stand latch pin 281 in the normal position. The latching arm hook 265 also has an outer (second) surface 267 and a distal end 270.

In order to rotate the container 210 from the normal position (FIGS. 8-14) counterclockwise (direction B) to the cleaning position (FIG. 16), the latching mechanism must include structure to, when desired by the user, prevent the engagement of the latching arm 264 with the topside of the stand latch pin 281. As will be explained, the blocking arm 272 provides this structure. The proximal end 258 of the blocking arm 272 is pivotally attached to a blocking arm (second) pivot 277, which is attached to the latching arm 264 proximate to the proximal end 278 of the latching arm 264. A second torsion spring or other retention mechanism is located in the blocking arm pivot 277 to bias or force the blocking arm 272 in the clockwise direction (direction A) to rest against the distal end 270 of the latching arm hook 265. As seen best in FIG. 17, the distal end 275 of the blocking arm 272 includes a blocking arm extension 276 extending toward the rear end 216 of the container 210 that contacts the distal end 270 of the latching arm hook 265. The blocking arm has an inner (first) surface 273 and an outer (second) surface 274.

Figure 19:
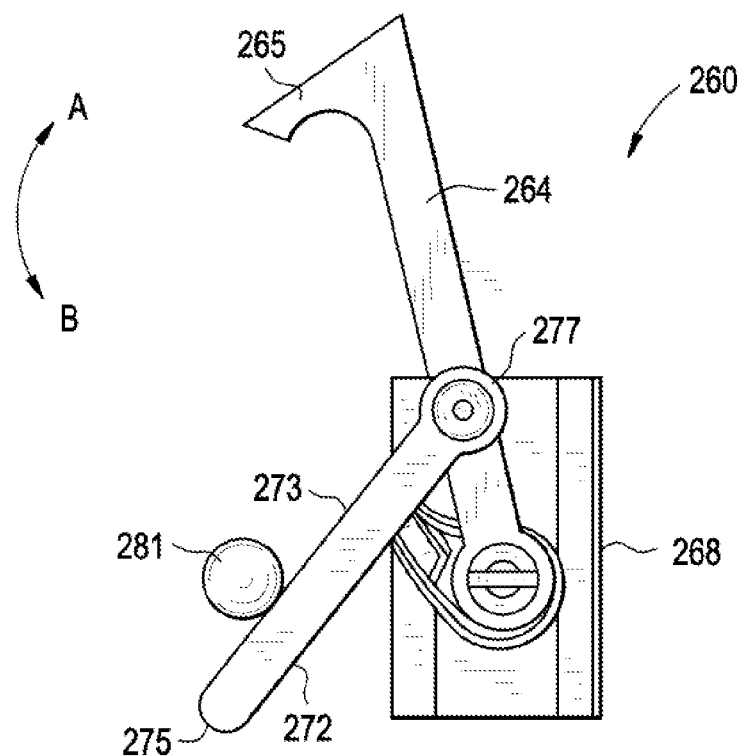
FIG. 19 is a schematic diagram of the exemplary latching mechanism of the exemplary litter box assembly of FIG. 8 being rotated clockwise (direction A) from the normal position of FIG. 18 to the resetting position of FIG. 20.
Figure 20:
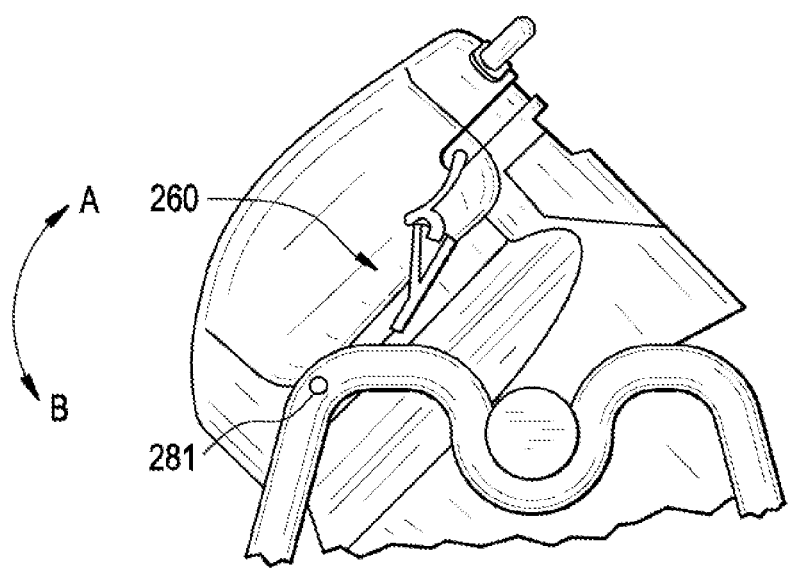
FIG. 20 is an enlarged view of the exemplary latching mechanism of the exemplary litter box assembly of FIG. 8 in the resetting position.
Figure 21:
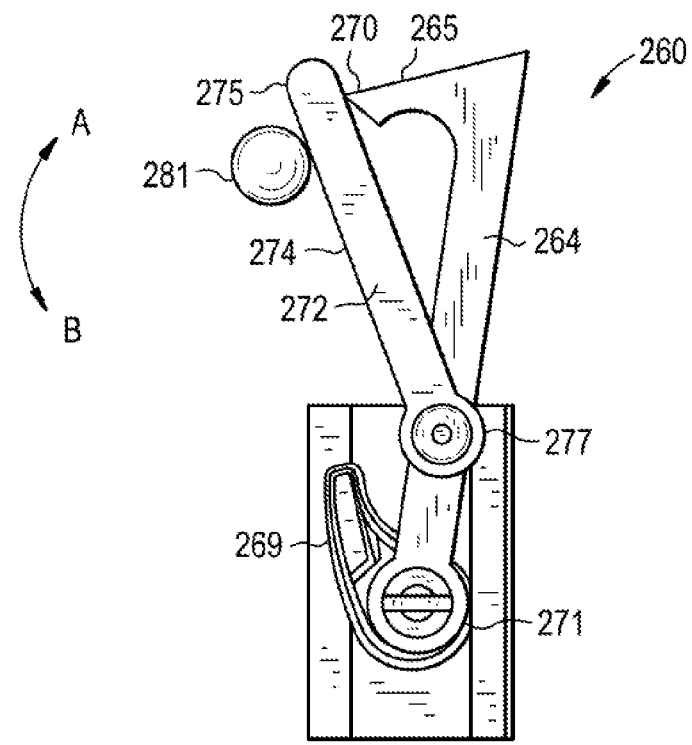
FIG. 21 is a schematic diagram of the exemplary latching mechanism of the exemplary litter box assembly of FIG. 8 being rotated counterclockwise (direction B) from the resetting position of FIG. 20 to the cleaning position of FIG. 22.

To illustrate the process of releasing the latch mechanism 260 from its normal position (FIGS. 8-14 and 17-18), FIG. 19 is a schematic diagram of the exemplary latching mechanism 260 of the exemplary litter box assembly 200 of FIG. 8 being rotated clockwise (direction A) from the normal position of FIG. 18 toward the resetting position of FIG. 20. FIG. 20 is an enlarged view of the exemplary latching mechanism 260 of the exemplary litter box assembly 200 of FIG. 8 in the resetting position. In order to release the latching mechanism 260 from its normal position (FIGS. 8-14 and 17-18), after the distal end 259 of the latch lever cam lock 262 is released as described above, the container 210 is first rotated in a clockwise direction (direction A) toward the resetting position (FIGS. 15 and 20). As the container 210 is rotated in a clockwise direction (direction A), the latching mechanism 260, which is attached to the container 210 by the latching arm attachment block 268 also moves with the container 210. Accordingly, the latching arm hook 265 of the latching arm 264 moves in a clockwise direction (direction A) away from the stand latch pin 281. As the container 210 moves in a clockwise direction (direction A), the inner surface 273 of the blocking arm 272 contacts the stand latch pin 281, which causes the blocking arm 272 to rotate in a counterclockwise direction (direction B) about the blocking arm pivot 277 against the force of the second torsion spring. If the container 210 were to be rotated in a counterclockwise direction (direction B) from the position of the latching mechanism 260 shown in FIG. 19, the latch member hook 265 would once again engage the topside of the stand latch pin 281 and prevent any further rotation counterclockwise direction (direction B) to the cleaning position (FIG. 16). However, if the container 210 is further rotated toward the resetting position (FIG. 15) in a clockwise direction (direction A) from the position of the latching mechanism 260 shown in FIG. 19 until the distal end 275 of the blocking arm 272 moves past the stand latch pin 281, the second torsion spring causes the blocking arm 272 to move clockwise (direction A) to return to its position resting against the distal end 270 of the latching arm hook 265 as shown in FIGS. 20 and 21. As will be explained, the position of the blocking arm 272 will prevent the latch member hook 265 from engaging the topside of the stand latch pin 281 when the container 210 is rotated in the counterclockwise direction (direction B) toward the cleaning position (FIGS. 16 and 22).

Figure 22:
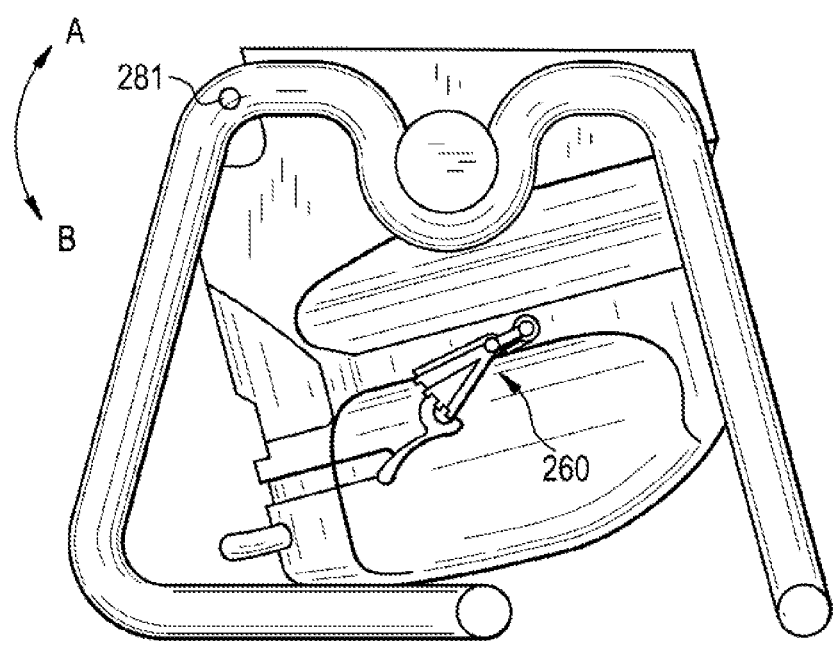
FIG. 22 is an enlarged view of the exemplary latching mechanism of the exemplary litter box assembly of FIG. 8 in the cleaning position.

FIG. 21 is a schematic diagram of the exemplary latching mechanism 260 of the exemplary litter box assembly 200 of FIG. 8 being rotated counterclockwise (direction B) from the resetting position of FIG. 20 toward the cleaning position of FIG. 22. FIG. 22 is an enlarged view of the exemplary latching mechanism 260 of the exemplary litter box assembly 200 of FIG. 8 in the cleaning position (FIG. 16). As can be seen in FIG. 21, when the container 210 is rotated from the resetting position of FIG. 20 in the counterclockwise direction (direction B) toward the cleaning position (FIGS. 16 and 22), the outer surface 274 of the blocking arm 272 contacts the stand latch pin 281 causing the blocking arm extension 276 of the latch block member 272 to press against the distal end 270 of the latching arm hook 265. This causes the latching arm 264 to rotate clockwise (direction A) on the latching arm pivot 271 away from the latching arm stop 269 and against the force of the first torsion spring. This arrangement of the blocking arm 272 and the latching arm 264 prevents the latching arm hook 265 from engaging the stand latch pin 281 when the container 210 is rotated in the counterclockwise direction (direction B) toward the cleaning position (FIGS. 16 and 22). When the container 210 is further rotated toward the cleaning position (FIG. 16) in a counterclockwise direction (direction B) from the position of the latching mechanism 260 shown in FIG. 11 until the distal end 275 of the blocking arm 272 moves past the stand latch pin 281, the first torsion spring causes the latching arm 264 to move counterclockwise (direction B) to return to its position resting against the latching arm stop 269 as shown in FIGS. 22 and 23.

Figure 23:
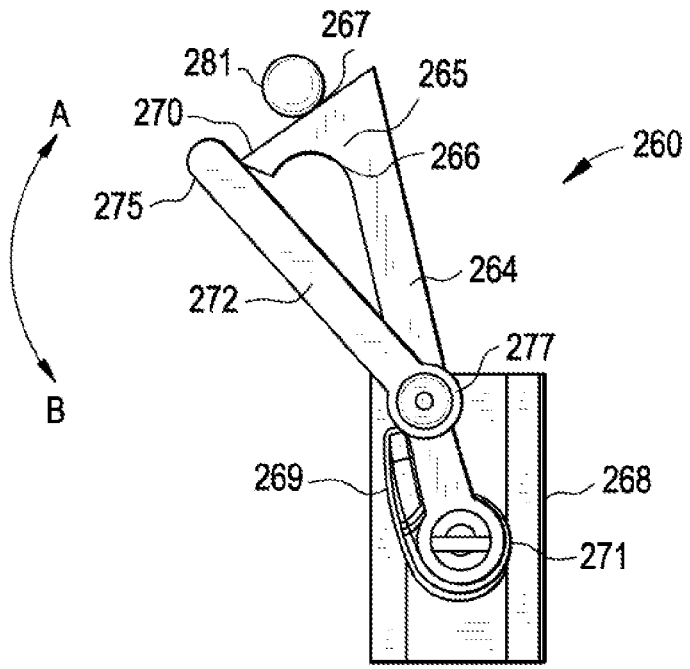
FIG. 23 is a schematic diagram of the exemplary latching mechanism of the exemplary litter box assembly of FIG. 8 being rotated clockwise (direction A) from the cleaning position of FIG. 22 to the normal position of FIG. 18 or the resetting position of FIG. 20.
Figure 24:
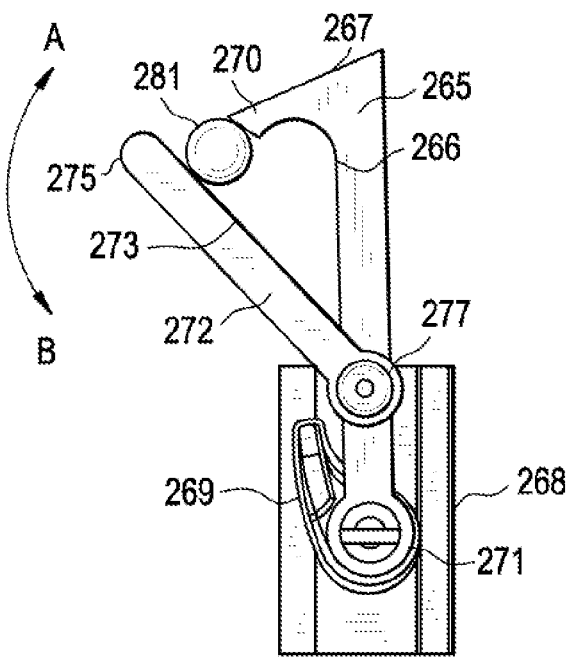
FIG. 24 is a schematic diagram of the exemplary latching mechanism of the exemplary litter box assembly of FIG. 8 being rotated clockwise (direction A) from the position of FIG. 23 to the normal position of FIG. 18 or the resetting position of FIG. 20.

FIGS. 23 and 24 are schematic diagrams of the exemplary latching mechanism 260 of the exemplary litter box assembly 200 of FIG. 8 being rotated clockwise (direction A) from the cleaning position of FIG. 22 toward the normal position of FIG. 18 or the resetting position of FIG. 20. As can be seen in FIG. 23, when the container 210 is rotated from the cleaning position of FIG. 22 in the clockwise direction (direction A) toward the release position (FIG. 20), the outer surface 267 of the latching arm hook 265 contacts the stand latch pin 281 causing the latching arm 264 to rotate clockwise (direction A) on the latching arm pivot 271 away from the latching arm stop 269 and against the force of the first torsion spring. This is caused by the acute angle of the outer surface 267 of the latching arm hook 265 relative to the proximal end 278 of the latching arm. This arrangement of the latching arm 264 and stand latch pin 281 allows the latching arm 264 to rotate past the stand latch pin 281 once the stand latch pin 281 moves past the outer surface 267 as shown in FIG. 24. When the container 210 is further rotated in the clockwise direction (direction A) and the stand latch pin 281 moves past the distal end 270 of the latching arm hook 265 after creating a scissor type split between the latching arm 264 and the blocking arm 272, the first torsion spring causes the latching arm 264 to move counterclockwise (direction B) to return to its position resting against the latching arm stop 269 and the stand latch pin 281 as shown in FIG. 18 in the normal position. At this point, the user can continue to rotate the container 210 in the clockwise direction (direction A) to the resetting position as discussed above with respect to FIGS. 19 and 20 or lock the container 210 in the normal position by locking the latch lever cam lock 262 as shown in FIG. 17. Accordingly, this process of rotating and tapping the container 210 can continue until the user decides to return the container 210 to the normal position.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A litter box assembly for removing waste from litter, the litter box assembly comprising:
   a container having a length, the container comprising
   a longitudinal axis extending through the length of the container;
   a first end comprising an enclosed opening for allowing an animal to enter an interior of the container;
   a center section adjacent to the first end of the container, the center section comprising a first litter pan substantially parallel to the longitudinal axis for holding the litter;
   a second end adjacent to the center section of the container, the second end comprising a drawer extending across the interior of the container transversely to the longitudinal axis, the drawer comprising a grate for filtering the waste from the litter from the first litter pan, and a second litter pan extending transversely to the longitudinal axis of the container proximate to the drawer for receiving the litter from the first litter pan that passes through the grate of the drawer, wherein the drawer is located between the first litter pan and the second litter pan;
   a stand configured to rest on a supporting surface, wherein the container is mounted to the stand, and wherein the stand is configured to suspend the container above and parallel to the supporting surface in a first position, and to rotate the container in a first rotational direction to a second position and a second and opposite rotational direction to a third position;
   a latch mechanism for controlling rotational movement of the container with respect to the stand, the latch mechanism comprising
      a pin,
      a first arm having a proximal end and a distal end, the proximal end of the first arm pivotally attached to a first pivot, wherein the first pivot biases the first arm in the first rotational direction toward the pin, and the distal end of the first arm having a hook having a first surface and a second surface, the first surface of the hook configured for contacting and engaging the pin when the container is rotated in the first rotational direction from the first position toward the second position and preventing further rotation of the container in the first rotational direction, and the second surface of the hook oriented an acute angle relative to the proximal end of the first arm and configured for contacting the pin when the container is rotated in the second rotational direction from the second position toward the third position and rotating the first arm in the second rotational direction against the bias of the first pivot past the pin to allow further rotation of the container in the second rotational direction, and
      a second arm having a proximal end and a distal end, the proximal end of the second arm pivotally attached to a second pivot attached proximate to the proximal end of the first arm, wherein the second pivot biases the second arm in the second rotational direction toward the hook, and the distal end of the second arm having an extension configured for contacting the hook at the distal end of the first arm, wherein the second arm has a first surface and a second surface, the first surface of the second arm configured for contacting the pin when the container is rotated in the second rotational direction second rotational direction from the second position toward the third position and rotating the first arm in the first rotational direction against the bias of the first pivot past the pin to allow further rotation of the container in the second rotational direction, and the second surface of the second arm configured for contacting the pin when the container is rotated in the first rotational direction from the third position toward the second position and rotating the second arm in the second rotational direction to press against the hook and prevent the hook from contacting the pin to allow further rotation of the container in the first rotational direction.

2. The litter box assembly of claim 1, wherein the container further comprises:
   a first contact portion on the container configured for contacting a portion of the stand or the supporting surface when the container is rotated in the first rotational direction to the second position, wherein the container is configured so that a vibration caused by the first contact portion contacting the portion of the stand or the supporting surface in the second position will facilitate litter moving from the first litter pan to the second litter pan through the drawer.

3. The litter box assembly of claim 2, wherein the first contact portion is located on the second end of the container.

4. The litter box assembly of claim 3, wherein the first contact portion is a bottom outer surface of the second end of the container.

5. The litter box assembly of claim 3, wherein the first contact portion is a handle located on a side of the second end of the container.

6. The litter box assembly of claim 1, wherein the container further comprises:
   a second contact portion on the container configured for contacting a portion of the stand or the supporting surface when the container is rotated in the second rotational direction to the third position, wherein the container is configured so that a vibration caused by the second contact portion contacting the portion of the stand or the supporting surface in the third position will facilitate litter moving from the second litter pan to the first litter pan through the drawer.

7. The litter box assembly of claim 6, wherein the second contact portion is located on the first end of the container.

8. The litter box assembly of claim 7, wherein the second contact portion is a bottom outer surface of the first end of the container.

9. The litter box assembly of claim 7, wherein the second contact portion is located on the second end of the container.

10. The litter box assembly of claim 9, wherein the second contact portion is a handle located on the side of the second end of the container.

11. The litter box assembly of claim 1, wherein the drawer is detachably attached to the container.

12. The litter box assembly of claim 1, wherein the drawer and the grate extend across the interior of the container such that all of the litter and the waste moving from the first litter pan to the second litter pan passes into the drawer and onto the grate.

13. The litter box assembly of claim 1, wherein the second litter pan is detachably attached to the container.

14. The litter box assembly of claim 1, wherein the center section further comprises a window opposite of the first litter pan.

15. A litter box assembly for removing waste from litter, the litter box assembly comprising:
- a container having a length, the container comprising
- a longitudinal axis extending through the length of the container;
- a first end comprising an enclosed opening for allowing an animal to enter an interior of the container;
- center section adjacent to the first end of the container, the center section comprising a first litter pan substantially parallel to the longitudinal axis for holding the litter;
- a second end adjacent to the center section of the container, the second end comprising a drawer extending across the interior of the container transversely to the longitudinal axis, the drawer comprising a grate for filtering the waste from the litter from the first litter pan, and a second litter pan extending transversely to the longitudinal axis of the container proximate to the drawer for receiving the litter from the first litter pan that passes through the grate of the drawer, wherein the drawer is located between the first litter pan and the second litter pan,
- a stand configured to rest on a supporting surface, wherein the container is mounted to the stand, and wherein the stand is configured to suspend the container above and parallel to the supporting surface in a first position, and to rotate the container in a first rotational direction to a second position and a second and opposite rotational direction to a third position; and
- a latch mechanism located proximate to the second end of the container for controlling rotational movement of the container with respect to the stand, the latch mechanism comprising:
  - a pin extending from the stand toward the second end of the container;
  - a first arm having a proximal end and a distal end, the proximal end of the first arm pivotally attached to a first pivot attached to the second end of the container, wherein the first pivot biases the first arm in the first rotational direction toward the pin, and the distal end of the first arm having a hook having a first surface and a second surface, the first surface of the hook configured for contacting and engaging the pin when the container is rotated in the first rotational direction from the first position toward the second position and preventing further rotation of the container in the first rotational direction, and the second surface of the hook oriented an acute angle relative to the proximal end of the first arm and configured for contacting the pin when the container is rotated in the second rotational direction from the second position toward the third position and rotating the first arm in the second rotational direction against the bias of the first pivot past the pin to allow further rotation of the container in the second rotational direction; and
  - a second arm having a proximal end and a distal end, the proximal end of the second arm pivotally attached to a second pivot attached proximate to the proximal end of the first arm, wherein the second pivot biases the second arm in the second rotational direction toward the hook, and the distal end of the second arm having an extension extending toward the second end of the container and configured for contacting the hook at the distal end of the first arm, wherein the second arm has a first surface and a second surface, the first surface of the second arm configured for contacting the pin when the container is rotated in the second rotational direction second rotational direction from the second position toward the third position and rotating the first arm in the first rotational direction against the bias of the first pivot past the pin to allow further rotation of the container in the second rotational direction, and the second surface of the second arm configured for contacting the pin when the container is rotated in the first rotational direction from the third position toward the second position and rotating the second arm in the second rotational direction to press against the hook and prevent the hook from contacting the pin to allow further rotation of the container in the first rotational direction.

16. The litter box assembly of claim 15, further comprising a stop attached to the second end of the container for restricting further rotation of the first arm in the first rotational direction.

17. The litter box assembly of claim 15, further comprising lever pivotally attached to the second end of the container and contacting the pin to prevent rotation of the container in the second rotational direction.

18. A litter box assembly for removing waste from litter, the litter box assembly comprising:
- a container having a length, the container comprising
- a longitudinal axis extending through the length of the container,
- a first end comprising an enclosed opening for allowing an animal to enter an interior of the container,
- a center section adjacent to the first end of the container, the center section comprising a first litter pan substantially parallel to the longitudinal axis for holding the litter, and
- a second end adjacent to the center section of the container, the second end comprising a drawer extending across the interior of the container transversely to the longitudinal axis, the drawer comprising a grate for filtering the waste from the litter from the first litter pan, and, a second litter pan extending transversely to the longitudinal axis of the container proximate to the drawer for receiving the litter from the first litter pan that passes through the grate of the drawer, wherein the drawer is located between the first litter pan and the second litter pan;
- a stand configured to rest on a supporting surface, wherein the contain is mounted to the stand, and wherein the stand is configured to suspend the container above and parallel to the supporting surface in a first position, and to rotate the container in a first rotational direction to a second position and a second and opposite rotational direction to a third position;
- a first contact portion on the container configured for contacting a portion of the stand or the supporting surface when the container is rotated in the first rotational direction to the second position, wherein the container is configured so that a vibration caused by the first contact portion contacting the portion of the stand or the supporting surface in the second position will facilitate litter moving from the first litter pan to the second litter pan through the drawer;
- a second contact portion on the container configured for contacting a portion of the stand or the supporting surface when the container is rotated in the second rotational direction to the third position, wherein the container is configured so that a vibration caused by the second contact portion contacting the portion of the stand or the supporting surface in the third position will facilitate litter moving from the second litter pan to the first litter pan through the drawer; and a latch mechanism located proximate to the second end of the container for controlling rotational movement of the container with respect to the stand, the latch mechanism comprising
   a pin extending from the stand toward the second end of the container,
   a first arm having a proximal end and a distal end, the proximal end of the first arm pivotally attached to a first pivot attached to the second end of the container, wherein the first pivot biases the first arm in the first rotational direction toward the pin, and the distal end of the first arm having a hook having a first surface and a second surface, the first surface of the hook configured for contacting and engaging the pin when the container is rotated in the first rotational direction from the first position toward the second position and preventing further rotation of the container in the first rotational direction, and the second surface of the hook oriented an acute angle relative to the proximal end of the first arm and configured for contacting the pin when the container is rotated in the second rotational direction from the second position toward the third position and rotating the first arm in the second rotational direction against the bias of the first pivot past the pin to allow further rotation of the container in the second rotational direction, and
   a second arm having a proximal end and a distal end, the proximal end of the second arm pivotally attached to a second pivot attached proximate to the proximal end of the first arm, wherein the second pivot biases the second arm in the second rotational direction toward the hook, and the distal end of the second arm having an extension extending toward the second end of the container and configured for contacting the hook at the distal end of the first arm, wherein the second arm has a first surface and a second surface, the first surface of the second arm configured for contacting the pin when the container is rotated in the second rotational direction second rotational direction from the second position toward the third position and rotating the first arm in the first rotational direction against the bias of the first pivot past the pin to allow further rotation of the container in the second rotational direction, and the second surface of the second arm configured for contacting the pin when the container is rotated in the first rotational direction from the third position toward the second position and rotating the second arm in the second rotational direction to press against the hook and prevent the hook from contacting the pin to allow further rotation of the container in the first rotational direction.

\* \* \* \* \*

UNITED STATES PATENT AND TRADEMARK OFFICE
CERTIFICATE OF CORRECTION

PATENT NO. : 9,185,879 B2  Page 1 of 1
APPLICATION NO. : 13/907176
DATED : November 17, 2015
INVENTOR(S) : Rebecca Diane Bellini It is certified that error appears in the above-identified patent and that said Letters Patent is hereby corrected as shown below:

In the Claims

Column 18, Line 43, Claim 18, delete "contain" and insert --container--

Signed and Sealed this
Twenty-second Day of March, 2016

Michelle K. Lee
*Director of the United States Patent and Trademark Office*